US012578536B2

(12) United States Patent
Montfort et al.

(10) Patent No.: US 12,578,536 B2
(45) Date of Patent: Mar. 17, 2026

(54) BRAGG GRATINGS FOR AN AUGMENTED REALITY DISPLAY SYSTEM

(71) Applicant: MAGIC LEAP, INC., Plantation, FL (US)

(72) Inventors: Frédéric Montfort, Froideville (CH); Carlos Alberto Macias Romero, Pully (CH)

(73) Assignee: MAGIC LEAP, INC., Plantation, FL (US)

( * ) Notice: Subject to any disclaimer, the term of this patent is extended or adjusted under 35 U.S.C. 154(b) by 443 days.

(21) Appl. No.: 18/247,065

(22) PCT Filed: Sep. 30, 2021

(86) PCT No.: PCT/US2021/052903
§ 371 (c)(1),
(2) Date: Mar. 28, 2023

(87) PCT Pub. No.: WO2022/072653
PCT Pub. Date: Apr. 7, 2022

(65) Prior Publication Data
US 2023/0375787 A1 Nov. 23, 2023

Related U.S. Application Data

(60) Provisional application No. 63/085,454, filed on Sep. 30, 2020.

(51) Int. Cl.
*G02B 27/01* (2006.01)
*G02B 6/27* (2006.01)
*G02B 6/34* (2006.01)

(52) U.S. Cl.
CPC .............. *G02B 6/34* (2013.01); *G02B 6/276* (2013.01); *G02B 27/0172* (2013.01); *G02B 2027/0174* (2013.01)

(58) Field of Classification Search
CPC ...... G02B 6/34; G02B 6/276; G02B 27/0172; G02B 27/4272; G02B 27/4205;
(Continued)

(56) References Cited

U.S. PATENT DOCUMENTS

| | | | |
|---|---|---|---|
| 10,317,677 B2 * | 6/2019 | Levola | G02B 27/0081 |
| 10,782,537 B1 | 9/2020 | Chao et al. | |

(Continued)

FOREIGN PATENT DOCUMENTS

WO WO 2019135165 A2 7/2019

OTHER PUBLICATIONS

International Search Report and Written Opinion, dated Dec. 13, 2021, for International Patent Application No. PCT/US2021/052903. (7 pages).

*Primary Examiner* — William R Alexander
(74) *Attorney, Agent, or Firm* — Seed Intellectual Property Law Group LLP

(57) ABSTRACT

A head-mounted display system can include a head-mountable frame, a light projection system configured to output light to provide image content to a user's eye, and a waveguide supported by the frame. The waveguide can be configured to guide at least a portion of the light from the light projection system coupled into the waveguide to present the image content to the user's eye. The system can include a grating that includes a first reflective diffractive optical element and a second reflective diffractive optical element. The combination of the first and second reflective diffractive optical elements can operate as a transmissive diffractive optical element. The first reflective diffractive optical element can be a volume phase holographic grating. The second reflective diffractive optical element can be a liquid crystal polarization grating.

16 Claims, 14 Drawing Sheets

(58) Field of Classification Search
CPC .............. G02B 27/4261; G02B 27/283; G02B
2027/0174; G02B 2027/0194; G02F
2201/30
USPC ......................................................... 359/630
See application file for complete search history.

(56) References Cited

U.S. PATENT DOCUMENTS

| | | | |
|---|---|---|---|
| 2011/0181960 A1 | 7/2011 | Tanijiri | |
| 2014/0232651 A1 | 8/2014 | Kress et al. | |
| 2016/0231569 A1* | 8/2016 | Levola .............. | G02B 27/0081 |
| 2018/0239147 A1 | 8/2018 | Schowengerdt et al. | |
| 2018/0373115 A1* | 12/2018 | Brown ............... | G02B 27/0172 |
| 2019/0155034 A1* | 5/2019 | Singer ................. | G02B 6/0076 |
| 2020/0064637 A1* | 2/2020 | Popovich .............. | G02B 6/003 |
| 2020/0089319 A1* | 3/2020 | Popovich .............. | A61B 3/113 |
| 2020/0179153 A1* | 6/2020 | Wang ...................... | A61F 5/028 |
| 2020/0333606 A1* | 10/2020 | Popovich .............. | G06F 18/214 |

* cited by examiner

1010

θi

θout

1012

θout

θi

BRAGG GRATINGS FOR AN AUGMENTED REALITY DISPLAY SYSTEM

FIELD

This disclosure relates to eyepieces for virtual reality, augmented reality, and mixed reality systems.

DESCRIPTION OF THE RELATED ART

Modern computing and display technologies have facilitated the development of virtual reality, augmented reality, and mixed reality systems. Virtual reality, or "VR," systems create a simulated environment for a user to experience. This can be done by presenting computer-generated image data to the user through a head-mounted display. This image data creates a sensory experience which immerses the user in the simulated environment. A virtual reality scenario typically involves presentation of only computer-generated image data rather than also including actual real-world image data.

Augmented reality systems generally supplement a real-world environment with simulated elements. For example, augmented reality, or "AR," systems may provide a user with a view of the surrounding real-world environment via a head-mounted display. However, computer-generated image data can also be presented on the display to enhance the real-world environment. This computer-generated image data can include elements which are contextually-related to the real-world environment. Such elements can include simulated text, images, objects, etc. Mixed reality, or "MR," systems are a type of AR system which also introduce simulated objects into a real-world environment, but these objects typically feature a greater degree of interactivity. The simulated elements can often times be interactive in real time.

FIG. 1 depicts an example AR scene 1 where a user sees a real-world park setting 6 featuring people, trees, buildings in the background, and a concrete platform 20. In addition to these items, computer-generated image data is also presented to the user. The computer-generated image data can include, for example, a robot statue 10 standing upon the real-world platform 20, and a cartoon-like avatar character 2 flying by which seems to be a personification of a bumblebee, even though these elements 2, 10 are not actually present in the real-world environment.

SUMMARY

A head-mounted display system configured to be worn by a user can include a head-mountable frame, a light projection system configured to output light to provide image content to the user's eye, a waveguide supported by the frame. The waveguide can be configured to guide at least a portion of the light from the light projection system coupled into the waveguide to present said image content to said user's eye. The system can include a grating having a first reflective diffractive optical element including a volume phase holographic grating and a second reflective diffractive optical element including a liquid crystal polarization grating. The combination of the first and second reflective diffractive optical elements can be disposed on one side of the waveguide and be configured to operate as a transmissive diffractive optical element.

In various implementations, the first reflective diffractive optical element including the volume phase holographic grating can be configured to reflect light directed toward the first reflective diffractive optical element toward the second reflective diffractive optical element. The second reflective diffractive optical element including the liquid crystal polarization grating can be configured to reflect light reflected by the first reflective diffractive optical element back toward said first reflective diffractive optical element. The first reflective diffractive optical element can be configured to transmit light reflected by the second reflective diffractive optical element.

In some implementations, the first reflective diffractive optical element including the volume phase holographic grating can be configured to reflect light at a particular incident angle and transmit light at other incident angles. The second reflective diffractive optical element including the liquid crystal polarization grating can be configured to transmit incident light having a first polarization state and reflect incident light polarized having a second different polarization state. The first polarization state can be a linear polarization state and the second polarization state can be a circular polarization state. The polarization state of light can be changed as a result of reflection of the light by the first reflective diffractive optical element including the volume phase polarization grating. The polarization state of light can be changed to a polarization state that is transmitted by the second reflective diffractive optical element including the liquid crystal polarization grating as a result of reflection of the light by the first reflective diffractive optical element including the volume phase polarization grating.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

DETAILED DESCRIPTION

Overview

This disclosure describes improved transmissive diffractive optical elements or gratings such as Bragg gratings, which can be used in AR display systems to project images to a user's eye. The disclosed transmissive diffractive optical elements are efficient and easy to manufacture.

Example Head-Mounted Display Device

Figure 1:
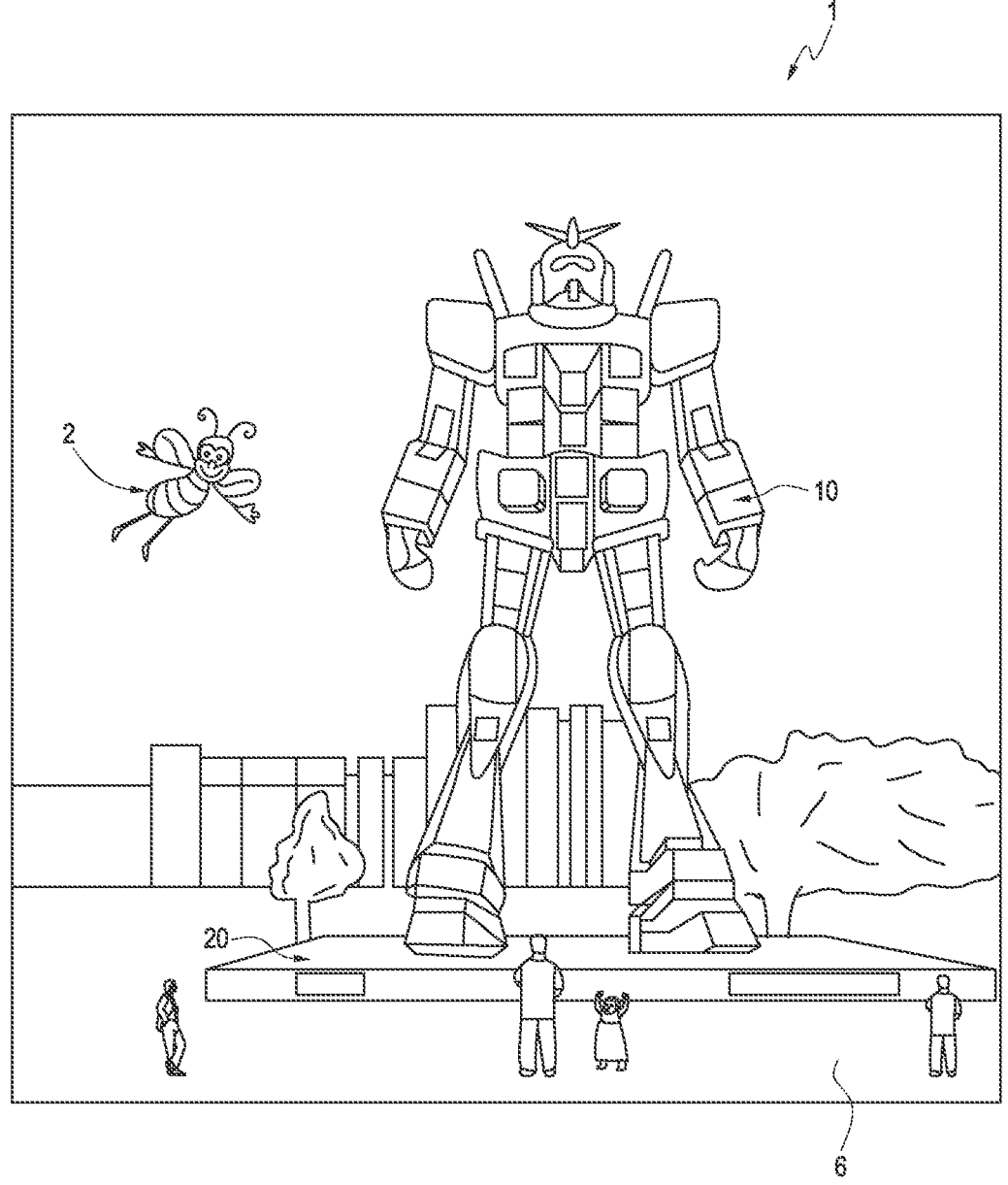
FIG. 1 illustrates a user's view of augmented reality (AR) through an AR device.
Figure 2:
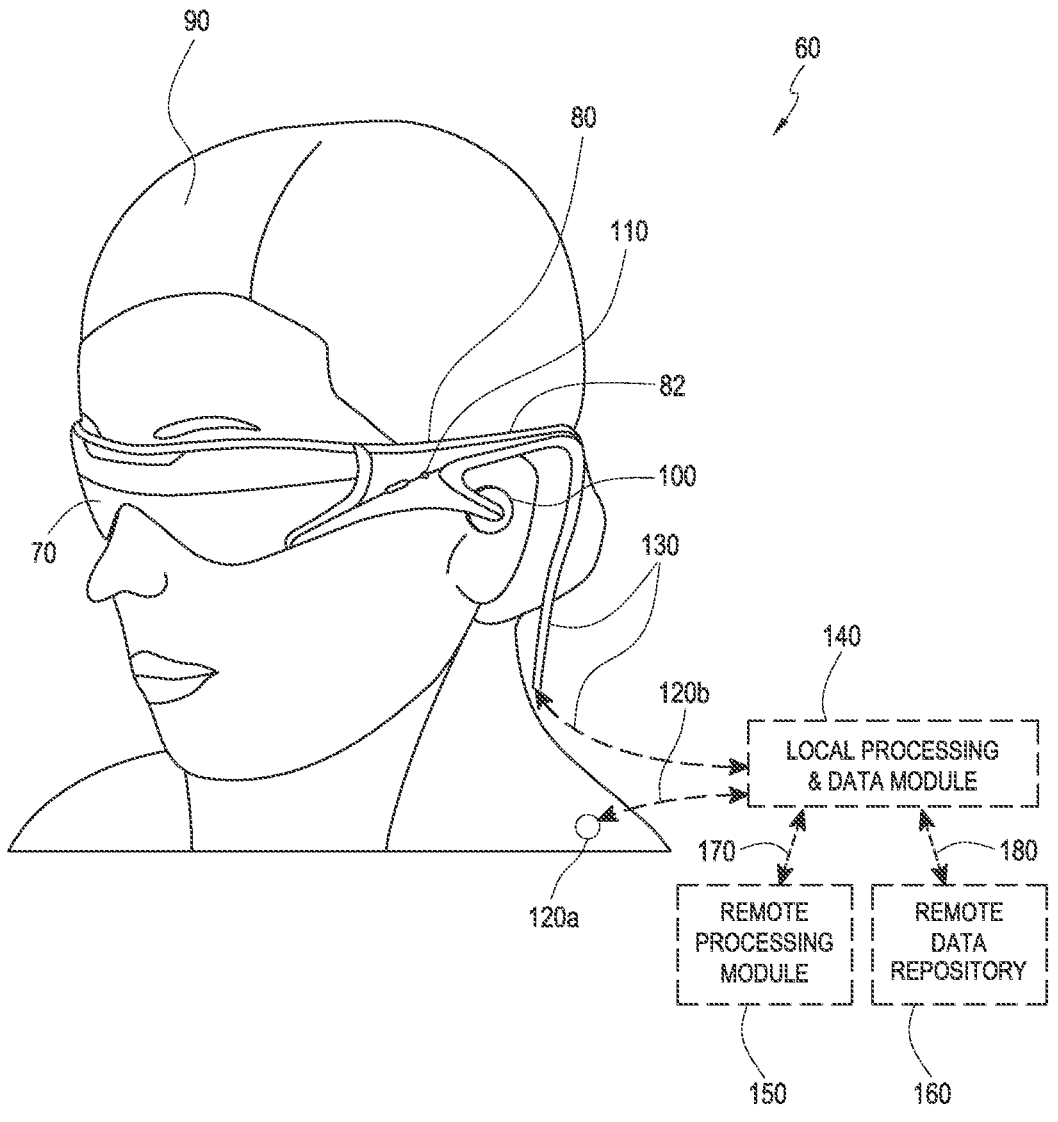
FIG. 2 illustrates an example of a wearable display system.

FIG. 2 illustrates an example wearable display system 60. The display system 60 includes a display or eyepiece 70, and various mechanical and electronic modules and systems to support the functioning of that display 70. The display 70 may be coupled to a frame 80, which is wearable by a display system user 90 and which is configured to position the display 70 in front of the eyes of the user 90. The display 70 may be considered eyewear in some embodiments. In some embodiments, a speaker 100 is coupled to the frame 80 and is positioned adjacent the ear canal of the user 90. The display system may also include one or more microphones 110 to detect sound. The microphone 110 can allow the user to provide inputs or commands to the system 60 (e.g., the selection of voice menu commands, natural language questions, etc.), and/or can allow audio communication with other persons (e.g., with other users of similar display systems). The microphone 110 can also collect audio data from the user's surroundings (e.g., sounds from the user and/or environment). In some embodiments, the display system may also include a peripheral sensor 120a, which may be separate from the frame 80 and attached to the body of the user 90 (e.g., on the head, torso, an extremity, etc.). The peripheral sensor 120a may acquire data characterizing the physiological state of the user 90 in some embodiments.

The display 70 is operatively coupled by a communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or removably attached to the user 90 (e.g., in a backpack-style configuration or in a belt-coupling style configuration). Similarly, the sensor 120a may be operatively coupled by communications link 120b (e.g., a wired lead or wireless connectivity) to the local processor and data module 140. The local processing and data module 140 may include a hardware processor, as well as digital memory, such as non-volatile memory (e.g., flash memory or a hard disk drive), both of which may be utilized to assist in the processing, caching, and storage of data. The data may include data 1) captured from sensors (which may be, e.g., operatively coupled to the frame 80 or otherwise attached to the user 90), such as image capture devices (e.g., cameras), microphones, inertial measurement units, accelerometers, compasses, GPS units, radio devices, gyros, and/or other sensors disclosed herein; and/or 2) acquired and/or processed using a remote processing module 150 and/or a remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and the remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone devices that communicate with the local processing and data module 140 by wired or wireless communication pathways.

The remote processing module 150 may include one or more processors to analyze and process data, such as image and audio information. In some embodiments, the remote data repository 160 may be a digital data storage facility, which may be available through the internet or other networking configuration in a "cloud" resource configuration. In some embodiments, the remote data repository 160 may include one or more remote servers, which provide information (e.g., information for generating augmented reality content) to the local processing and data module 140 and/or the remote processing module 150. In other embodiments, all data is stored and all computations are performed in the local processing and data module, allowing fully autonomous use from a remote module.

Figures 3, 4:
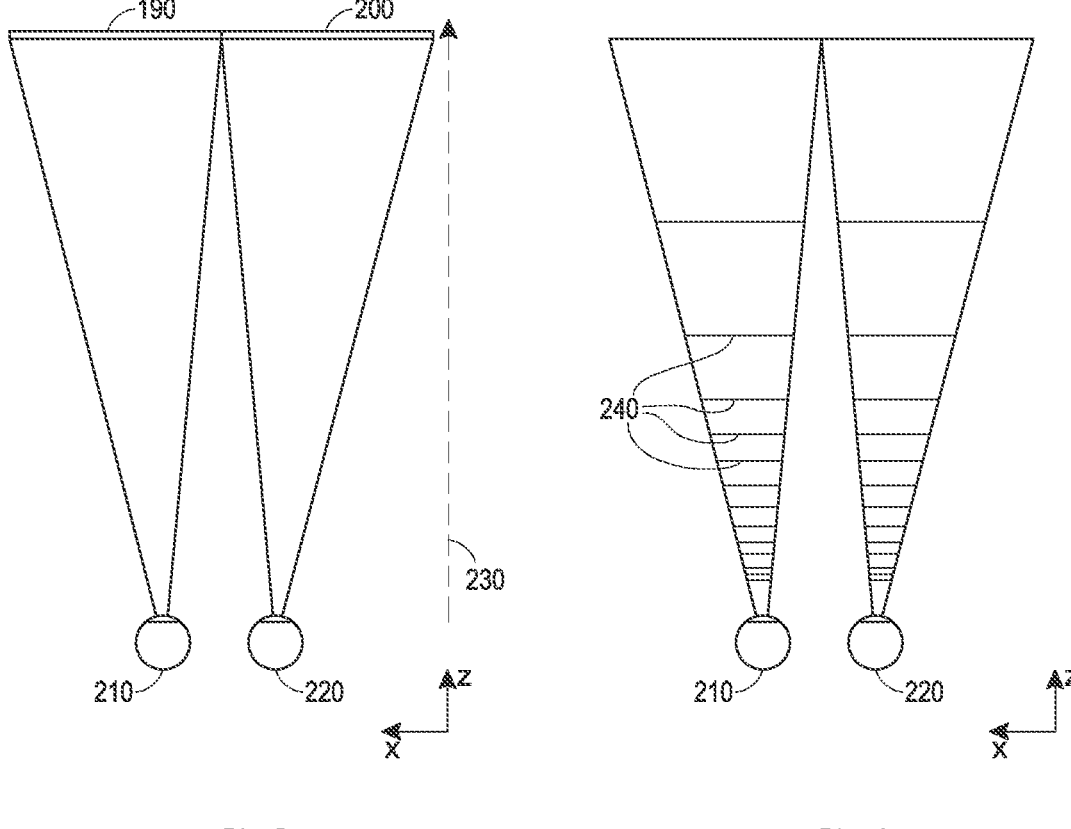
FIG. 3 illustrates a conventional display system for simulating three-dimensional image data for a user.
FIG. 4 illustrates aspects of an approach for simulating three-dimensional image data using multiple depth planes.

The perception of an image as being "three-dimensional" or "3-D" may be achieved by providing slightly different presentations of the image to each eye of the user. FIG. 3 illustrates a conventional display system for simulating three-dimensional image data for a user. Two distinct images 190, 200—one for each eye 210, 220—are output to the user. The images 190, 200 are spaced from the eyes 210, 220 by a distance 230 along an optical or z-axis that is parallel to the line of sight of the user. The images 190, 200 are flat and the eyes 210, 220 may focus on the images by assuming a single accommodated state. Such 3-D display systems rely on the human visual system to combine the images 190, 200 to provide a perception of depth and/or scale for the combined image.

However, the human visual system is complicated and providing a realistic perception of depth is challenging. For example, many users of conventional "3-D" display systems find such systems to be uncomfortable or may not perceive a sense of depth at all. Objects may be perceived as being "three-dimensional" due to a combination of vergence and accommodation. Vergence movements (e.g., rotation of the eyes so that the pupils move toward or away from each other to converge the respective lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, under normal conditions, a change in vergence will trigger a matching change in accommodation of lens shape and pupil size. As noted herein, many stereoscopic or "3-D" display systems display a scene using slightly different presentations (and, so, slightly different images) to each eye such that a three-dimensional perspective is perceived by the human visual system. Such systems can be uncomfortable for some users, however, since they simply provide image information at a single accommodated state and work against the "accommodation-vergence reflex." Display systems that provide a better match between accommodation and vergence may form more realistic and comfortable simulations of three-dimensional image data.

FIG. 4 illustrates aspects of an approach for simulating three-dimensional image data using multiple depth planes. With reference to FIG. 4, the eyes 210, 220 assume different accommodated states to focus on objects at various distances on the z-axis. Consequently, a particular accommodated state may be said to be associated with a particular one of the illustrated depth planes 240, which has an associated focal distance, such that objects or parts of objects in a particular depth plane are in focus when the eye is in the accommodated state for that depth plane. In some embodiments, three-dimensional image data may be simulated by providing different presentations of an image for each of the eyes 210, 220, and also by providing different presentations of the image corresponding to multiple depth planes. While the respective fields of view of the eyes 210, 220 are shown as being separate for clarity of illustration, they may overlap, for example, as distance along the z-axis increases. In addition, while the depth planes are shown as being flat for ease of illustration, it will be appreciated that the contours of a depth plane may be curved in physical space, such that all features in a depth plane are in focus with the eye in a particular accommodated state.

Figure 5A:
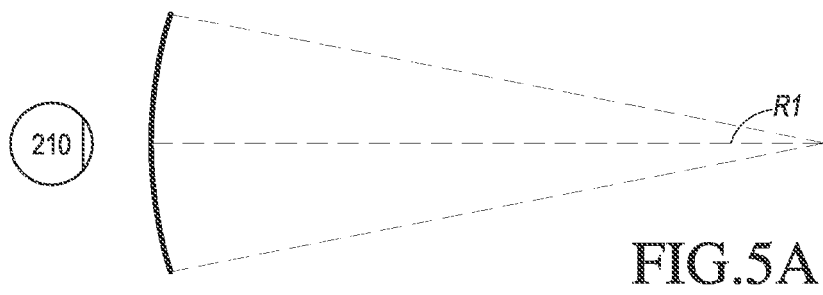
FIGS. 5A-5C illustrate relationships between radius of curvature and focal radius.
Figure 5B:
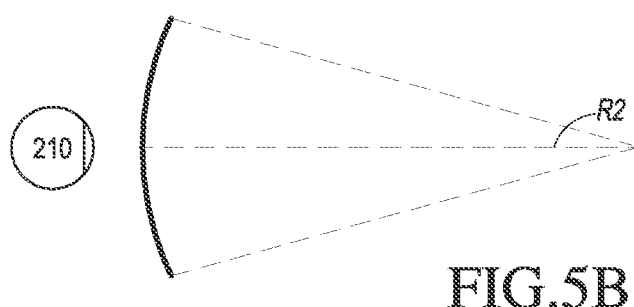
Figure 5C:
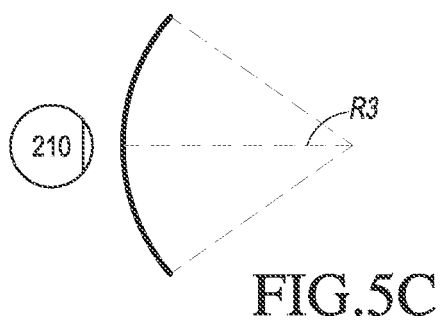

The distance between an object and an eye 210 or 220 may also change the amount of divergence of light from that object, as viewed by that eye. FIGS. 5A-5C illustrate relationships between distance and the divergence of light rays. The distance between the object and the eye 210 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. Consequently, at different depth planes, the degree of divergence of light rays is also different, with the degree of divergence increasing with decreasing distance between depth planes and the user's eye 210. While only a single eye 210 is illustrated for clarity of illustration in FIGS. 5A-5C and other figures herein, it will be appreciated that the discussions regarding the eye 210 may be applied to both eyes 210 and 220 of a user.

A highly believable simulation of perceived depth may be achieved by providing, to the eye, different presentations of an image corresponding to each of a limited number of depth planes. The different presentations may be separately focused by the user's eye, thereby helping to provide the user with depth cues based on the amount of accommodation of the eye required to bring into focus different image features for the scene located on different depth planes and/or based on observing different image features on different depth planes being out of focus.

Example of a Waveguide Stack Assembly for an AR or MR Eyepiece

Figure 6:
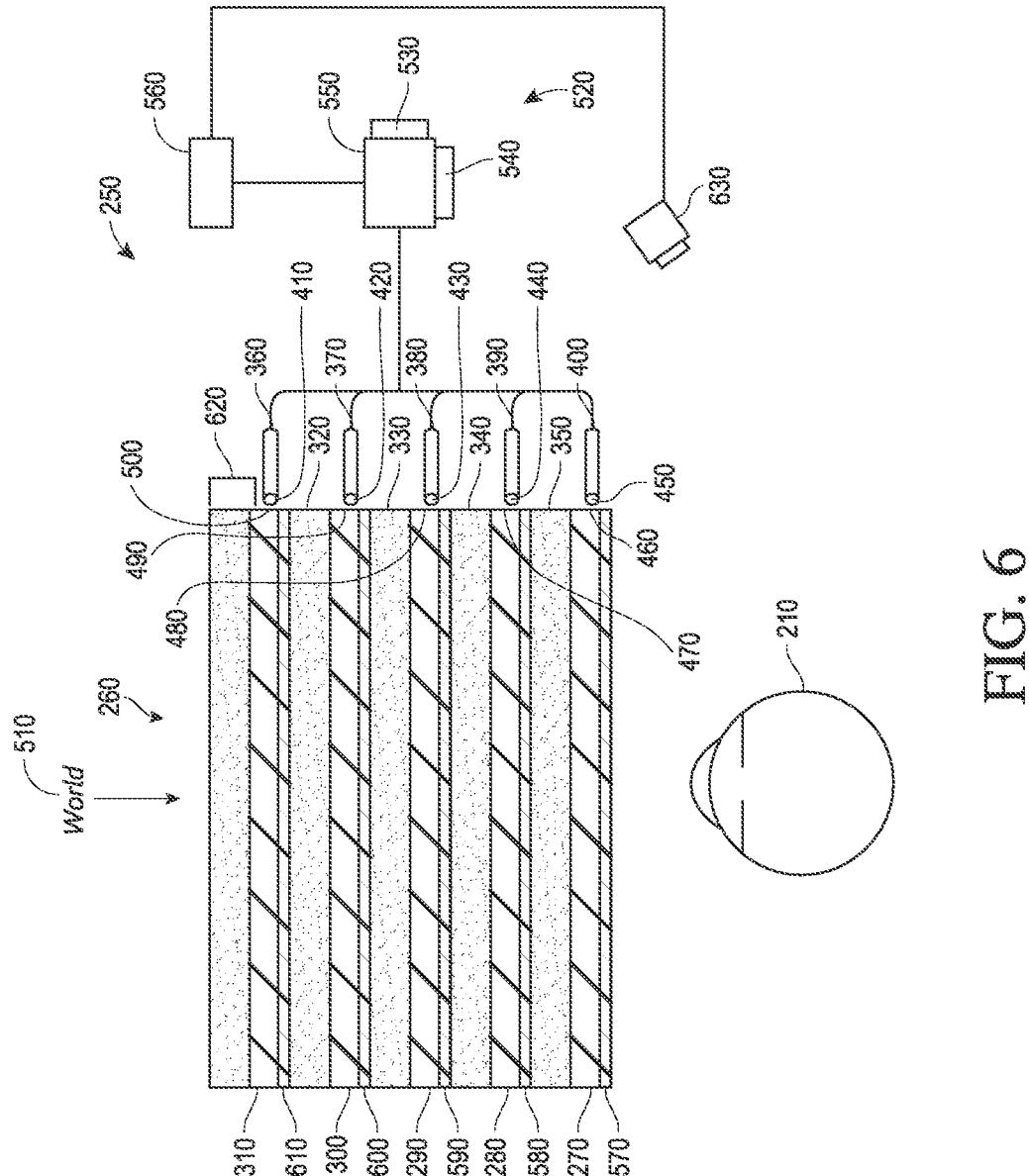
FIG. 6 illustrates an example of a waveguide stack for outputting image information to a user in an AR eyepiece.

FIG. 6 illustrates an example of a waveguide stack for outputting image information to a user in an AR eyepiece. A display system 250 includes a stack of waveguides, or stacked waveguide assembly, 260 that may be utilized to provide three-dimensional perception to the eye/brain using a plurality of waveguides 270, 280, 290, 300, 310. In some embodiments, the display system 250 is the system 60 of FIG. 2, with FIG. 6 schematically showing some parts of that system 60 in greater detail. For example, the waveguide assembly 260 may be part of the display 70 of FIG. 2. It will be appreciated that the display system 250 may be considered a light field display in some embodiments.

The waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of each respective image injection device 360, 370, 380, 390, 400 and is injected into a corresponding input surface 460, 470, 480, 490, 500 of the respective waveguides 270, 280, 290, 300, 310. In some embodiments, the each of the input surfaces 460, 470, 480, 490, 500 may be an edge of a corresponding waveguide, or may be part of a major surface of the corresponding waveguide (that is, one of the waveguide surfaces directly facing the world 510 or the user's eye 210). In some embodiments, a beam of light (e.g. a collimated beam) may be injected into each waveguide and may be replicated, such as by sampling into beamlets by diffraction, in the waveguide and then directed toward the eye 210 with an amount of optical power corresponding to the depth plane associated with that particular waveguide. In some embodiments, a single one of the image injection devices 360, 370, 380, 390, 400 may be associated with, and inject light into, a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may transmit image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors.

In some embodiments, the light injected into the waveguides 270, 280, 290, 300, 310 is provided by a light projector system 520, which includes a light module 530, which may include a light source or light emitter, such as a light emitting diode (LED). The light from the light module 530 may be directed to, and modulated by, a light modulator 540 (e.g., a spatial light modulator), via a beamsplitter (BS) 550. The light modulator 540 may spatially and/or temporally change the perceived intensity of the light injected into the waveguides 270, 280, 290, 300, 310. Examples of spatial light modulators include liquid crystal displays (LCD), including a liquid crystal on silicon (LCOS) displays, and digital light processing (DLP) displays.

In some embodiments, the light projector system 520, or one or more components thereof, may be attached to the frame 80 (FIG. 2). For example, the light projector system 520 may be part of a temporal portion (e.g., ear stem 82) of the frame 80 or disposed at an edge of the display 70. In some embodiments, the light module 530 may be separate from the BS 550 and/or light modulator 540.

In some embodiments, the display system 250 may be a scanning fiber display comprising one or more scanning fibers to project light in various patterns (e.g., raster scan, spiral scan, Lissajous patterns, etc.) into one or more waveguides 270, 280, 290, 300, 310 and ultimately into the eye 210 of the user. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. One or more optical fibers may transmit light from the light module 530 to the one or more waveguides 270, 280, 290, 300, and 310. In addition, one or more intervening optical structures may be provided between the scanning fiber, or fibers, and the one or more waveguides 270, 280, 290, 300, 310 to, for example, redirect light exiting the scanning fiber into the one or more waveguides 270, 280, 290, 300, 310.

A controller 560 controls the operation of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310. In some embodiments, the controller may be a single integral device, or a distributed system connected by wired or wireless communication channels. The controller 560 may be part of the processing modules 140 or 150 (FIG. 2) in some embodiments.

The waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be output by the waveguide at locations at which the light propagating in the waveguide strikes a light extracting optical element. The out-coupling optical elements 570, 580, 590, 600, 610 may be, for example, diffractive optical features, including diffractive gratings, as discussed further herein. While the out-coupling optical elements 570, 580, 590, 600, 610 are illustrated as being disposed at the bottom major surfaces of the waveguides 270, 280, 290, 300, 310, in some embodiments they may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

Each waveguide 270, 280, 290, 300, 310 may output light to form an image corresponding to a particular depth plane. For example, the waveguide 270 nearest the eye may deliver collimated beams of light to the eye 210. The collimated beams of light may be representative of the optical infinity focal plane. The next waveguide up 280 may output collimated beams of light which pass through the first lens 350 (e.g., a negative lens) before reaching the eye 210. The first lens 350 may add a slight convex wavefront curvature to the collimated beams so that the eye/brain interprets light coming from that waveguide 280 as originating from a first focal plane closer inward toward the eye 210 from optical infinity. Similarly, the third waveguide 290 passes its output light through both the first lens 350 and the second lens 340 before reaching the eye 210. The combined optical power of the first lens 350 and the second lens 340 may add another incremental amount of wavefront curvature so that the eye/brain interprets light coming from the third waveguide 290 as originating from a second focal plane that is even closer inward from optical infinity than was light from the second waveguide 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate optical power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may output images set to the same depth plane, or multiple subsets of the waveguides 270, 280, 290, 300, 310 may output images set to the same plurality of depth planes, with one set for each depth plane. This can provide advantages for forming a tiled image to provide an expanded field of view at those depth planes.

The out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features with a diffractive efficiency sufficiently low such that only a portion of the power of the light in a beam is re-directed toward the eye 210 with each interaction, while the rest continues to move through a waveguide via TIR. Accordingly, the exit pupil of the light module 530 is replicated across the waveguide to create a plurality of output beams carrying the image information from light source 530, effectively expanding the number of locations where the eye 210 may intercept the replicated light source exit pupil. These diffractive features may also have a variable diffractive efficiency across their geometry to improve uniformity of light output by the waveguide.

In some embodiments, one or more diffractive features may be switchable between "on" states in which they actively diffract, and "off" states in which they do not significantly diffract. For instance, a switchable diffractive element may include a layer of polymer dispersed liquid crystal in which microdroplets form a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and IR light cameras) may be provided to capture images of the eye 210, parts of the eye 210, or at least a portion of the tissue surrounding the eye 210 to, for example, detect user inputs, extract biometric information from the eye, estimate and track the gaze direction of the eye, to monitor the physiological state of the user, etc. In some embodiments, the camera assembly 630 may include an image capture device and a light source to project light (e.g., IR or near-IR light) to the eye, which may then be reflected by the eye and detected by the image capture device. In some embodiments, the light source includes light emitting diodes ("LEDs"), emitting in IR or near-IR. In some embodiments, the camera assembly 630 may be attached to the frame 80 (FIG. 2) and may be in electrical communication with the processing modules 140 or 150, which may process image information from the camera assembly 630 to make various determinations regarding, for example, the physiological state of the user, the gaze direction of the wearer, iris identification, etc. In some embodiments, one camera assembly 630 may be utilized for each eye, to separately monitor each eye.

Figure 7A:
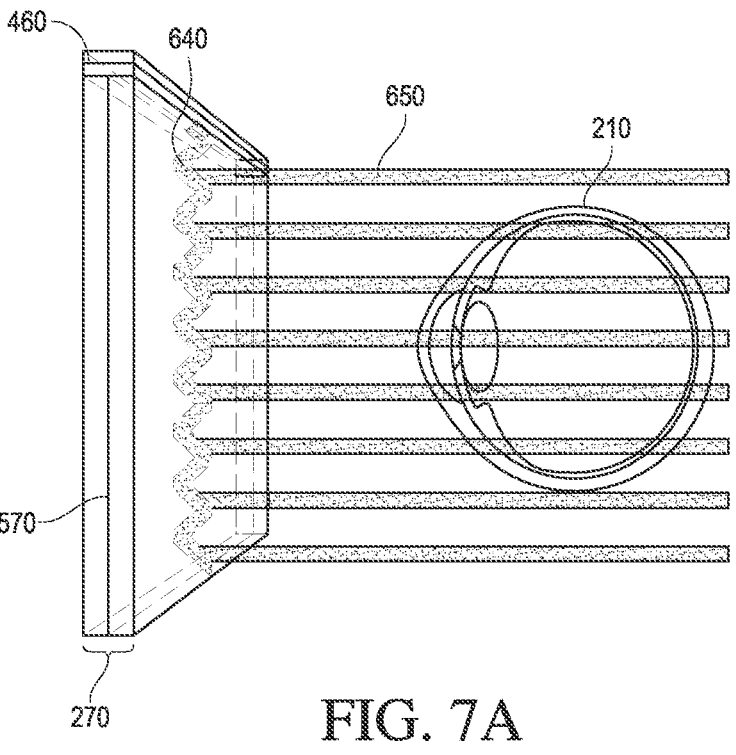
FIGS. 7A-7B illustrate examples of exit beams outputted by a waveguide.
Figure 7B:
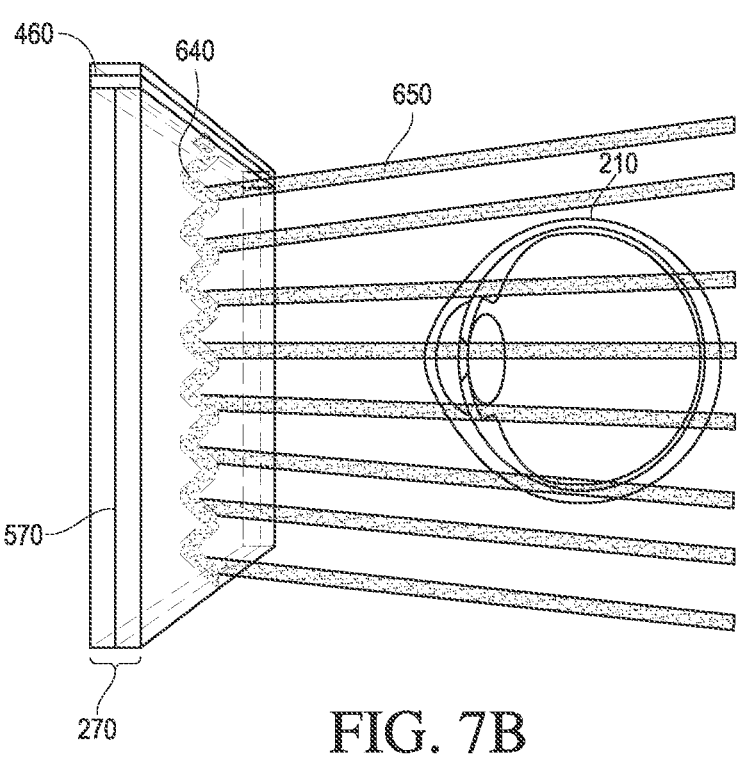

FIG. 7A illustrates an example of exit beams output by a waveguide. One waveguide is illustrated (with a perspective view), but other waveguides in the waveguide assembly 260 (FIG. 6) may function similarly. Light 640 is injected into the waveguide 270 at the input surface 460 of the waveguide 270 and propagates within the waveguide 270 by TIR. Through interaction with diffractive features, light exits the waveguide as exit beams 650. The exit beams 650 replicate the exit pupil from a projector device which projects images into the waveguide. Any one of the exit beams 650 includes a sub-portion of the total energy of the input light 640. And in a perfectly efficient system, the summation of the energy in all the exit beams 650 would equal the energy of the input light 640. The exit beams 650 are illustrated as being substantially parallel in FIG. 7A but, as discussed herein, some amount of optical power may be imparted depending on the depth plane associated with the waveguide 270. In some embodiments, parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, as shown in FIG. 7B. Moreover, divergent light within an individual one of the beams that is collected by the eye would cause the eye 210 to accommodate to a closer distance to bring this light into focus on the retina and would be interpreted by the brain as light from a distance closer to the eye 210 than optical infinity.

Figure 8:
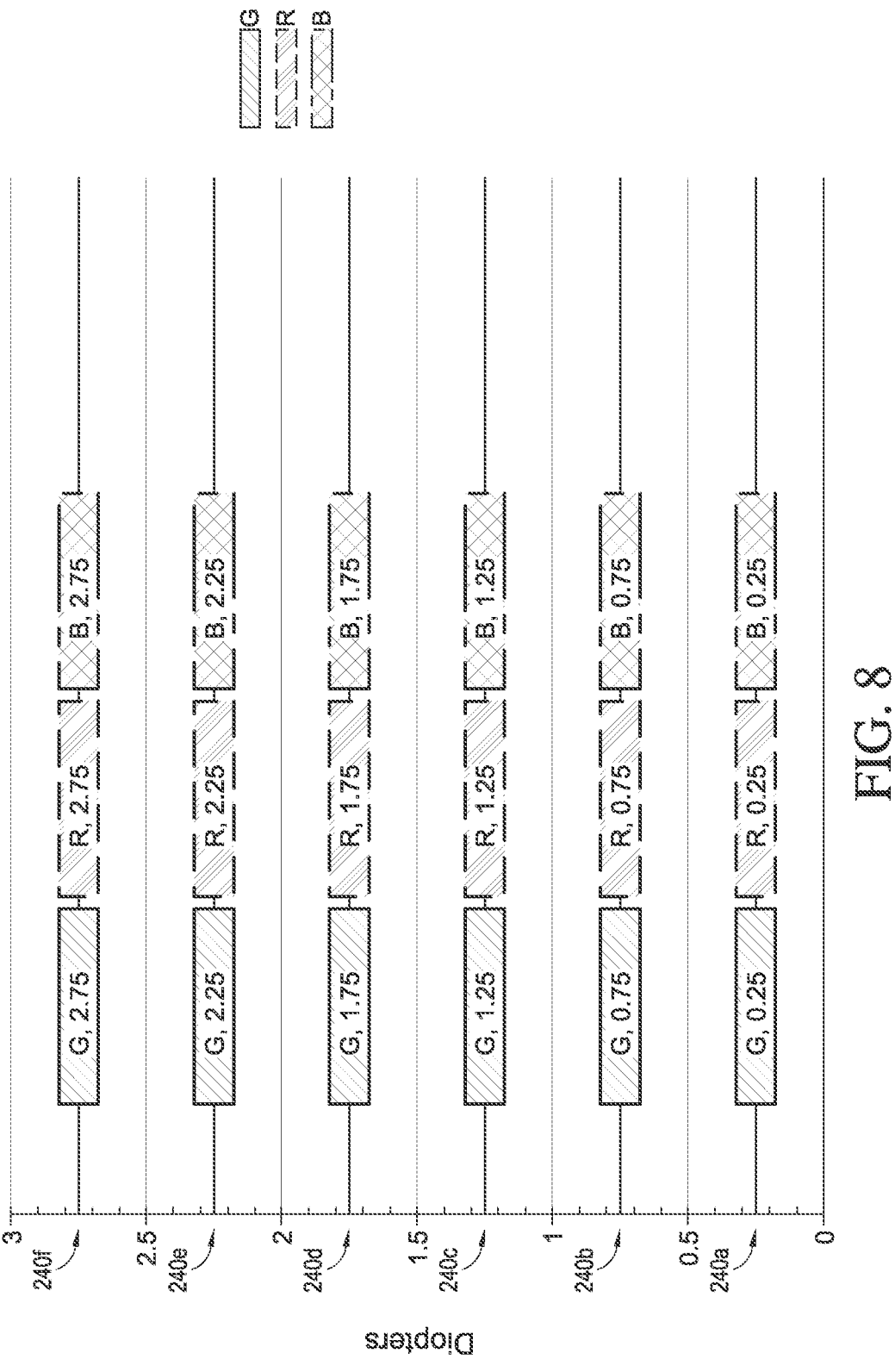
FIG. 8 illustrates an example of a stacked waveguide assembly in which each depth plane includes images formed using multiple different component colors.

In some embodiments, a full color image may be formed at each depth plane by overlaying images in each of the component colors (e.g., three or more component colors, such as red, green, and blue). FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different diopter powers following the letters G, R, and B. The numbers following each of these letters indicate diopters (1/m), or inverse distance of the depth plane from a user, and each box in the figure represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort or may decrease chromatic aberrations.

In some embodiments, light of each component color may be output by a single dedicated waveguide and, consequently, each depth plane may have multiple waveguides associated with it. In such embodiments, each box in the figure may be understood to represent an individual waveguide, and three waveguides may be provided per depth plane so as to display three component color images per depth plane. While the waveguides associated with each depth plane are shown adjacent to one another in this drawing for ease of illustration, it will be appreciated that, in a physical device, the waveguides may all be arranged in a stack with one waveguide per level. In some other embodiments, multiple component colors may be output by the same waveguide, such that, for example, only a single waveguide may be provided per depth plane.

With continued reference to FIG. 8, in some embodiments, G is the color green, R is the color red, and B is the color blue. In some other embodiments, other colors associated with other wavelengths of light, including yellow, magenta and cyan, may be used in addition to or may replace one or more of red, green, or blue. In some embodiments, features 320, 330, 340, and 350 may be active or passive optical filters configured to block or selectively pass light from the ambient environment to the user's eyes.

References to a given color of light throughout this disclosure should be understood to encompass light of one or more wavelengths within a range of wavelengths of light that are perceived by a user as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the user, for example, IR or ultraviolet wavelengths. IR light can include light with wavelengths in a range from 700 nm to 10 μm. In some embodiments, IR light can include near-IR light with wavelengths in a range from 700 nm to 1.5 μm. In addition, the in-coupling, out-coupling, and other light redirecting structures of the waveguides of the display 250 may be configured to direct and emit this light out of the display towards the user's eye 210, e.g., for imaging or user stimulation applications.

Figure 9A:
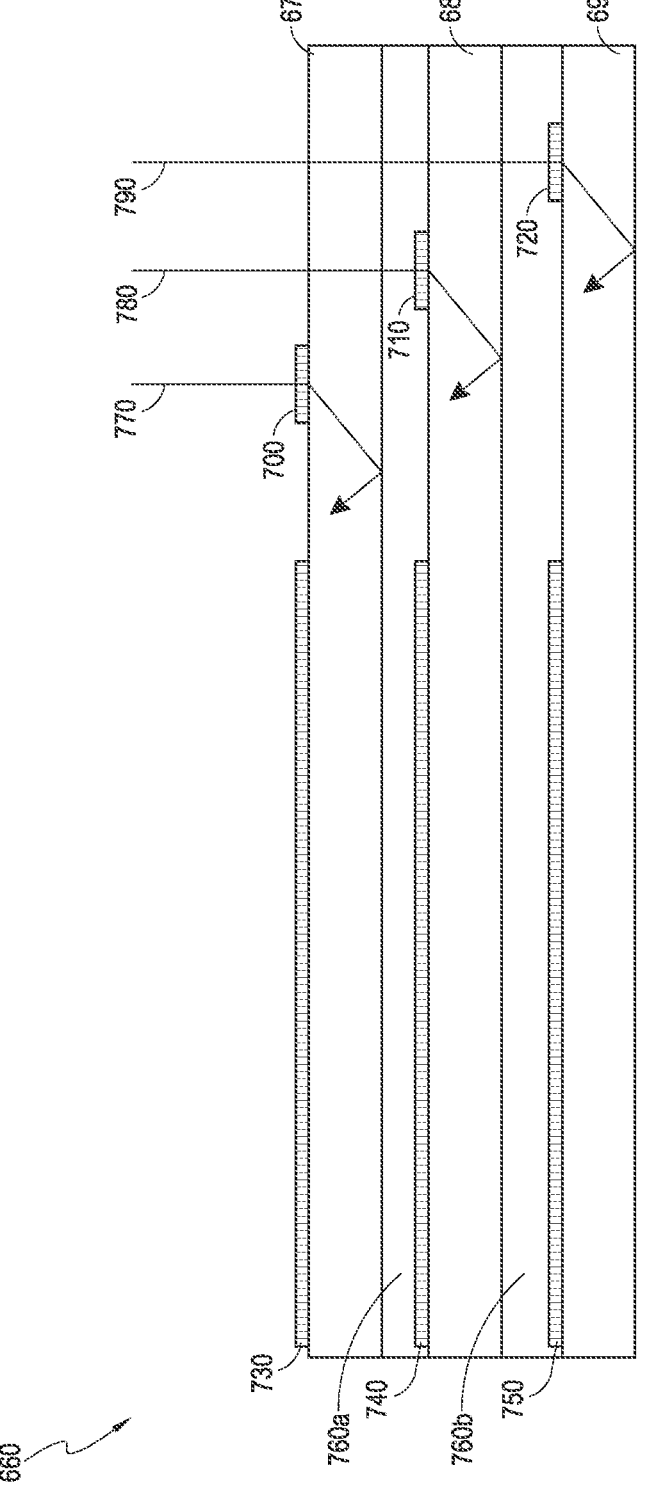
FIG. 9A illustrates a cross-sectional side view of an example of a set of stacked waveguides that each includes an in-coupling optical element.

With reference now to FIG. 9A, in some embodiments, light impinging on a waveguide may need to be redirected so as to in-couple the light into the waveguide. An in-coupling optical element may be used to redirect and in-couple the light into its corresponding waveguide. FIG. 9A illustrates a cross-sectional side view of an example of a set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position or orientation that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, for example, in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, for example, light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750 may be disposed on a bottom major surface of associated waveguides 670, 680, 690, respectively. In some other embodiments, the light distributing elements 730, 740, 750 may be disposed on both top and bottom major surface of associated waveguides 670, 680, 690 respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, for example, gas, liquid, or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is at least 0.05, or at least 0.10, less than the refractive index of the material forming the waveguides 670, 680, 690. Advantageously, the lower refractive index layers 760a, 760b may function as cladding layers that facilitate TIR of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In other embodiments, the material forming the waveguides 670, 680, 690 may be different between one or more waveguides, or the material forming the layers 760a, 760b may be different, while still holding to the various refractive index relationships noted above.

With continued reference to FIG. 9A, light rays 770, 780, 790 are incident on the set 660 of waveguides. Light rays 770, 780, 790 may be injected into the waveguides 670, 680, 690 by one or more image injection devices 360, 370, 380, 390, 400 (FIG. 6).

In some embodiments, the light rays 770, 780, 790 have different properties (e.g., different wavelengths or different ranges of wavelengths), which may correspond to different colors. The in-coupling optical elements 700, 710, 720 each re-direct the incident light such that the light propagates through a respective one of the waveguides 670, 680, 690 by TIR.

For example, in-coupling optical element 700 may be configured to re-direct ray 770, which has a first wavelength or range of wavelengths. Similarly, transmitted ray 780 impinges on and is re-directed by in-coupling optical element 710, which is configured to re-direct light of a second wavelength or range of wavelengths. Likewise, ray 790 is re-directed by in-coupling optical element 720, which is configured to selectively re-direct light of third wavelength or range of wavelengths.

With continued reference to FIG. 9A, light rays 770, 780, 790 are re-directed so that they propagate through a corresponding waveguide 670, 680, 690; that is, the in-coupling optical element 700, 710, 720 of each waveguide re-directs light into that corresponding waveguide 670, 680, 690 to in-couple light into that corresponding waveguide. The light rays 770, 780, 790 are re-directed at angles that cause the light to propagate through the respective waveguide 670, 680, 690 by TIR. The light rays 770, 780, 790 propagate through the respective waveguide 670, 680, 690 by TIR until interacting with the waveguide's corresponding light distributing elements 730, 740, 750.

Figure 9B:
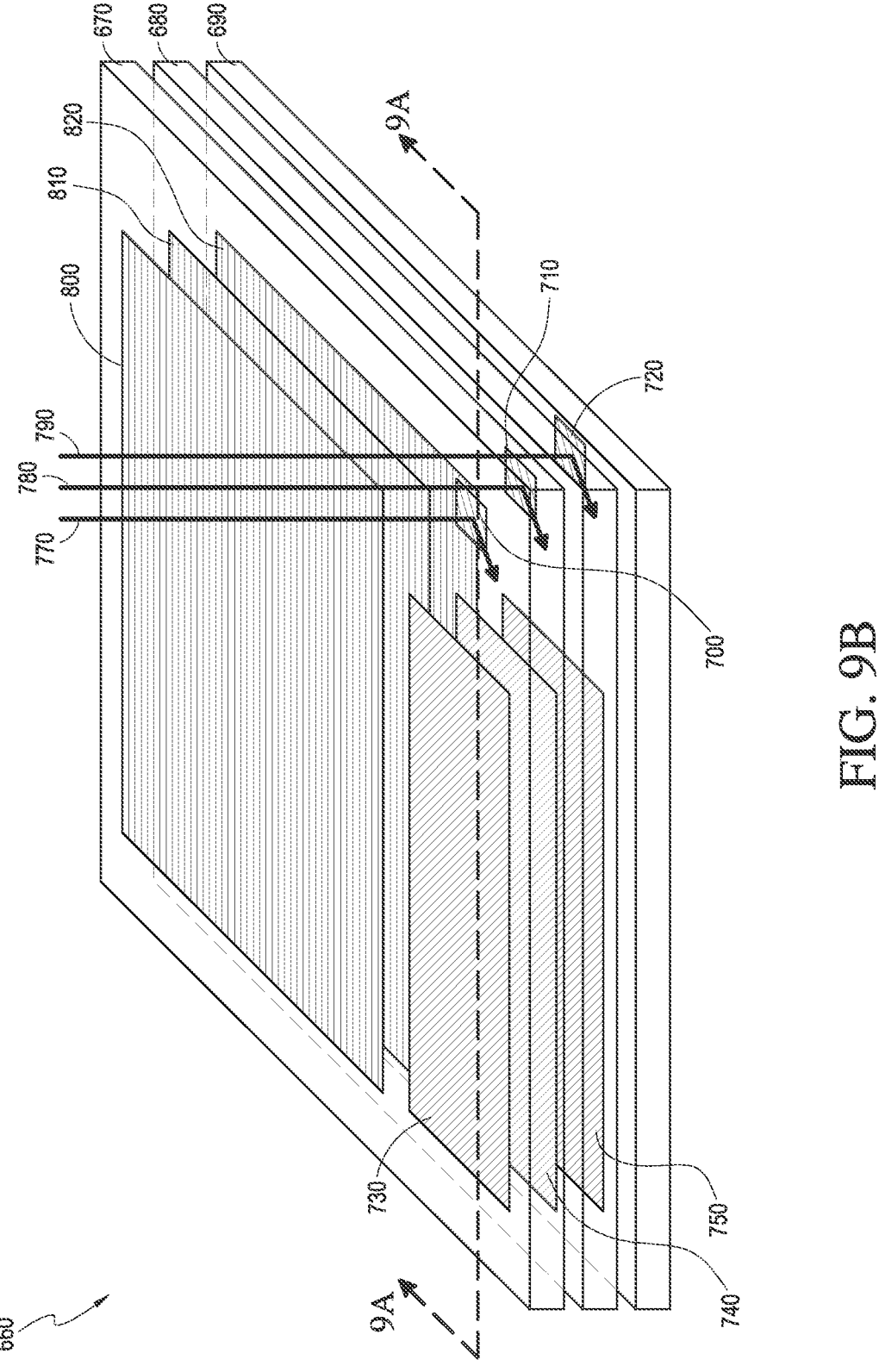
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the light rays 770, 780, 790, are in-coupled by the in-coupling optical elements 700, 710, 720, respectively, and then propagate by TIR within the waveguides 670, 680, 690, respectively. The light rays 770, 780, 790 then interact with the light distributing elements 730, 740, 750, respectively. The light distributing elements 730, 740, 750 re-direct the light rays 770, 780, 790 so that they propagate towards the out-coupling optical elements 800, 810, and 820, respectively.

In some embodiments, the light distributing elements 730, 740, 750 are orthogonal pupil expanders (OPEs). In some embodiments, the OPEs both re-direct light to the out-coupling optical elements 800, 810, 820 and also expand the pupil associated with this light by sampling the light rays 770, 780, 790 at many locations across the light distributing elements 730, 740, 750 as they propagate to the out-coupling optical elements. In some embodiments (e.g., where the exit pupil is already of a desired size), the light distributing elements 730, 740, 750 may be omitted and the in-coupling optical elements 700, 710, 720 may be configured to re-direct light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EPs) or exit pupil expanders (EPEs) that re-direct light out of the waveguides and toward a user's eye 210 (FIG. 7). The OPEs may be configured to increase the dimensions of the eye box in at least one axis and the EPEs may be configured to increase the eye box in an axis crossing (e.g., orthogonal to) the axis of the OPEs.

Accordingly, with reference to FIGS. 9A and 9B, in some embodiments, the set 660 of waveguides includes waveguides 670, 680, 690; in-coupling optical elements 700, 710, 720; light distributing elements (e.g., OPEs) 730, 740, 750; and out-coupling optical elements (e.g., EPEs) 800, 810, 820 for each component color. The waveguides 670, 680, 690 may be stacked with an air gap/cladding layer between each one. The in-coupling optical elements 700, 710, 720 direct incident light (with different in-coupling optical elements receiving light of different wavelengths) into a corresponding waveguide. The light then propagates at angles which support TIR within the respective waveguide 670, 680, 690. Since TIR only occurs for a certain range of angles, the range of propagation angles of the light rays 770, 780, 790 is limited. The range of angles which support TIR may be thought of in such an example as the angular limits of the field of view which can be displayed by the waveguides 670, 680, 690. In the example shown, light ray 770 (e.g., blue light) is in-coupled by the first in-coupling optical element 700, and then continues to reflect back and forth from the surfaces of the waveguide while traveling down the waveguide, with the light distributing element (e.g., OPE) 730 progressively sampling it to create additional replicated rays which are directed toward the out-coupling optical element (e.g., EPE) 800, in a manner described earlier. The light rays 780 and 790 (e.g., green and red light, respectively) will pass through the waveguide 670, with light ray 780 impinging on and being in-coupled by in-coupling optical element 710. The light ray 780 then propagates down the waveguide 680 via TIR, proceeding on to its light distributing element (e.g., OPE) 740 and then the out-coupling optical element (e.g., EPE) 810. Finally, light ray 790 (e.g., red light) passes through the waveguides 670, 680 to impinge on the light in-coupling optical element 720 of the waveguide 690. The light in-coupling optical element 720 in-couples the light ray 790 such that the light ray propagates to light distributing element (e.g., OPE) 750 by TIR, and then to the out-coupling optical element (e.g., EPE) 820 by TIR. The out-coupling optical element 820 then finally out-couples the light ray 790 to the user, who also receives the out-coupled light from the other waveguides 670, 680.

Figure 9C:
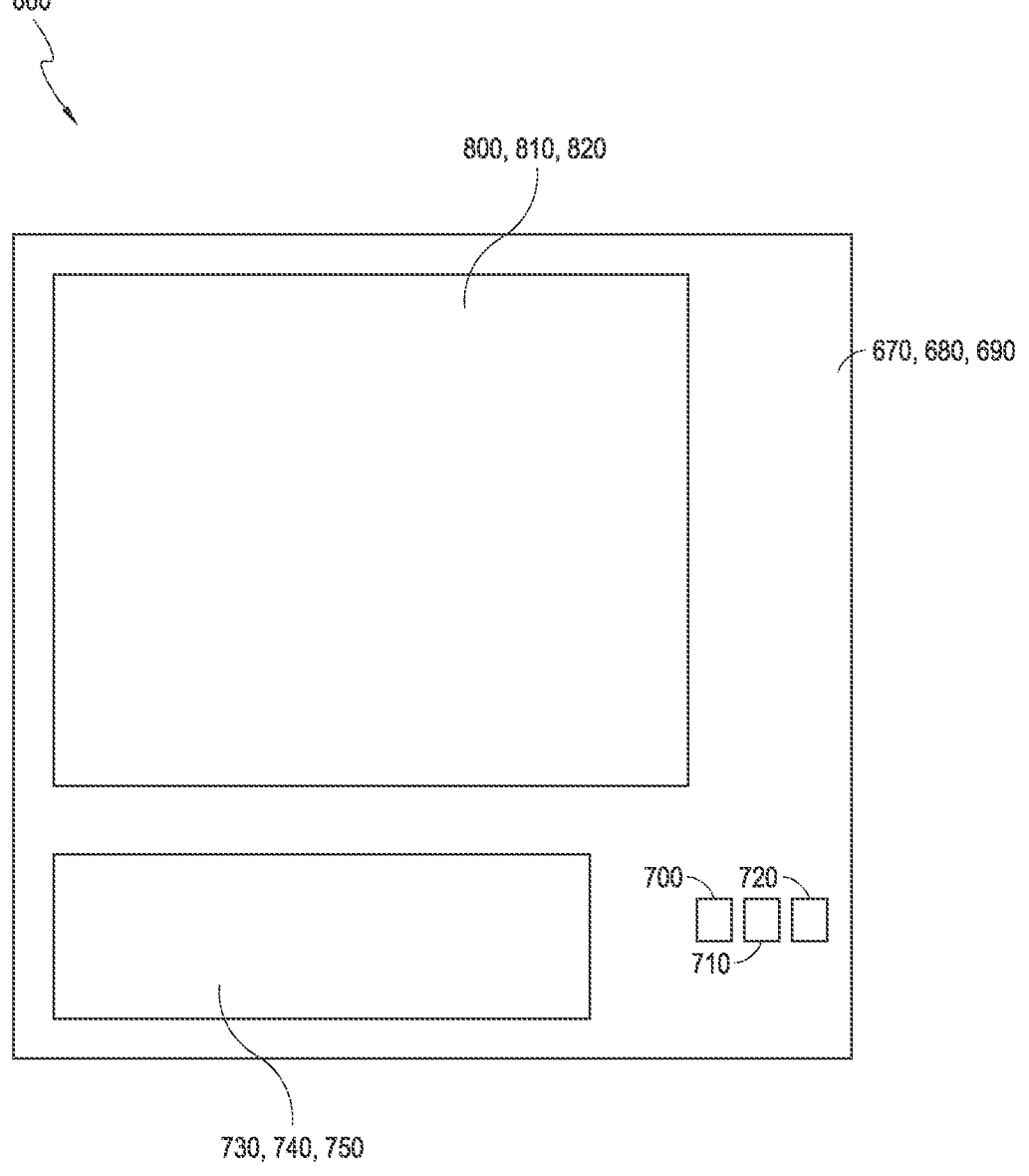
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. In some implementations, the in-coupling optical elements 700, 710, 720 are not vertically aligned; rather, the in-coupling optical elements may be non-overlapping (e.g., laterally spaced apart as seen in the top-down view). This non-overlapping spatial arrangement may facilitate the injection of light from different sources into different waveguides on a one-to-one basis, thereby allowing a specific light source to be uniquely optically coupled to a specific waveguide. In some embodiments, arrangements including non-overlapping spatially separated in-coupling optical elements may be referred to as a shifted pupil system, and the in-coupling optical elements within these arrangements may correspond to sub pupils.

Diffractive Optical Elements (DOEs) Such as Bragg Gratings

A diffraction grating or diffractive optical element such as a Bragg grating is an optical element with spatially varying optical properties and/or features (for example, a periodic variation in the refractive index) that can selectively diffract light at a particular wavelength and/or wavelength range. Volume gratings or diffractive optical elements such as Bragg gratings may include variations in refractive index within a volume of optically transmissive material and can, for example, be formed in a substrate that may be transparent, such as glass, polymer, or the like. The material (and/or the substrate) may be isotropic. For example, a volume grating or diffractive optical element, such as a volume Bragg grating, can be made by irradiating a photosensitive material (such as, photosensitive glass, dichromatic gelatin, etc.) with light (such as, ultraviolet light) that is spatially modulated using an interference pattern to vary the localized optical properties (e.g., refractive index) of the material. In various implementations, a volume diffractive optical element such as a volume Bragg gratings and other diffraction gratings or diffractive optical elements can include a substrate and within the substrate a plurality of different zones having a periodically repeating lateral dimension corresponding to a grating period adapted for light diffraction. Diffraction gratings such as Bragg gratings can be used in a wide variety of applications, including beam combining, optical filtering, light coupling, optical tuning, or the like.

Figure 10A:
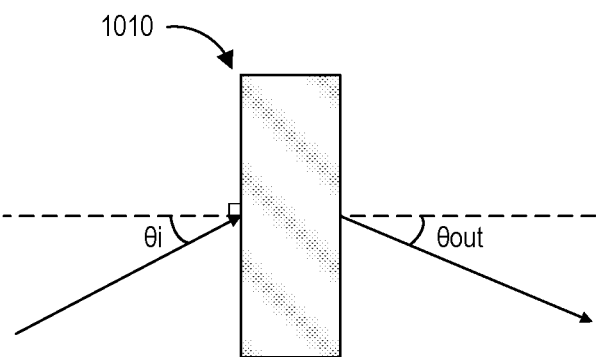
FIGS. 10A and 10C illustrates transmission Bragg gratings.
Figure 10B:
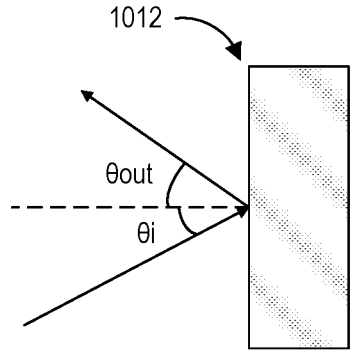
FIGS. 10B and 10D illustrates reflection Bragg gratings.

Without being bound to any theory, a volume Bragg grating that is a transmissive (or transmission or transmitting) diffractive optical element can diffract transmitted light at or around a wavelength that satisfies the Bragg condition:

$$\lambda_t = 2\wedge \sin(\theta_i + \theta_{tilt}) \tag{1}$$

where $\lambda_t$ is the wavelength of the diffracted light, A is the grating period, $\theta_i$ is the incident angle of light (measured relative to the direction normal to the grating), and $\theta_{tilt}$ is the angle of tilt of grating inside the medium (for example, angle of tilt of the cross-hatching pattern in FIG. 10A, which illustrates a Bragg grating 1010 that is a transmissive or transmission diffractive optical element diffracting transmitted light at wavelength $\lambda_t$). As shown in FIG. 10A, angle $\theta_{out}$ is the angle of refraction. A Bragg grating that is a reflective (or reflection or reflecting) diffractive optical element can diffract reflected light at or around a wavelength that satisfies the Bragg condition:

$$\lambda_r = 2\wedge \cos(\theta_i + \theta_{tilt}) \tag{2}$$

where $\lambda_r$ is the wavelength of the diffracted light. While for simplicity, the incident angles, angles of tilt, and grating periods in Equations 1 and 2 are the same, in some instances one or more of these parameters can be different. Diffraction of light by a Bragg grating 1012 that is a reflective or reflection diffractive optical element is illustrated in FIG. 10B with angle $\theta_{out}$ being the angle of reflection.

Figure 10C:
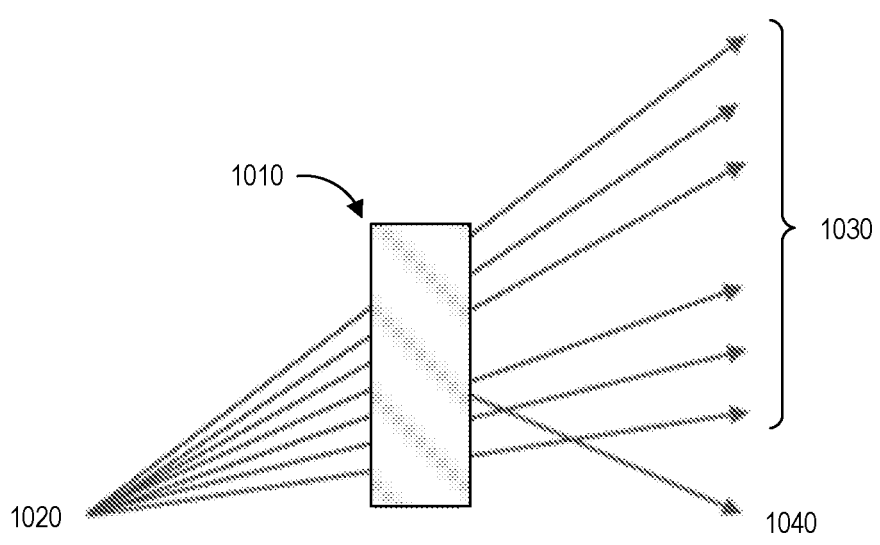
Figure 10D:
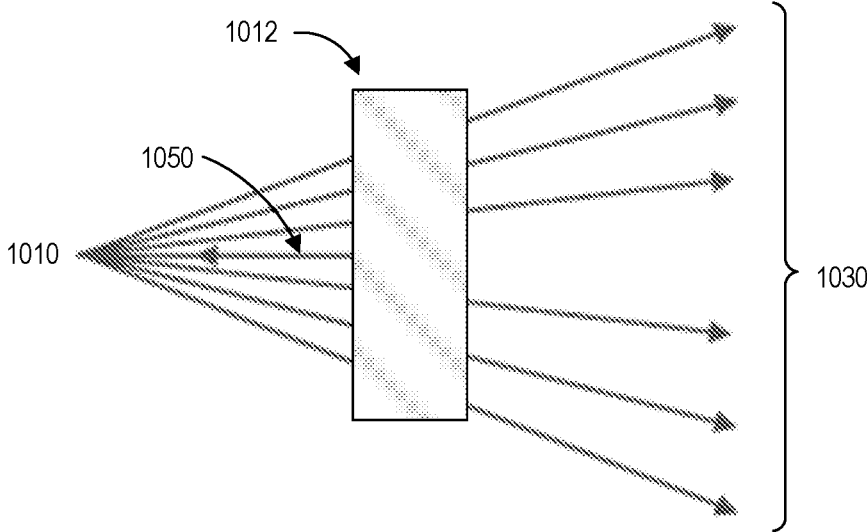

Light at other wavelengths and/or incident angles can pass through the diffractive optical element or grating (e.g., Bragg grating) without being substantially affected or specifically, without being diffracted. With reference to FIGS. 10C and 10D, light from a source 1020 is incident on the diffractive optical elements (e.g., volume DOEs or gratings or Bragg gratings) 1010 and 1012 that are transmissive and reflective DOEs, gratings, or Bragg gratings, respectively. In FIG. 10C, a light ray 1040 having the wavelength and oriented at the incident angle that satisfy the Bragg condition in Equation 1 is diffracted by the Bragg grating 1010. Because the Bragg grating comprises a transmissive Bragg grating or transmissive diffractive optical element, the light that is diffracted is transmitted through the Bragg grating. In FIG. 10D, a light ray 1050 having the wavelength and oriented at the incident angle that satisfy the Bragg condition in Equation 2 is diffracted by the Bragg grating 1012. Because the Bragg grating comprises a reflective Bragg grating or reflective diffractive optical element, the light that is diffracted is reflected from the Bragg grating. All the other light rays 1030 (having other wavelengths and/or oriented at other incident angles) pass through the Bragg gratings 1010 and 1012 without being substantially affected (e.g., diffracted), as shown in FIGS. 10C and 10D. Accordingly, Bragg gratings can provide wavelength and angular selectivity.

Liquid Crystal Gratings

Diffractive optical elements may comprise liquid crystal. Some such optical elements may be referred to herein as liquid crystal polarization gratings ("LCPG"). Liquid crystal polarization gratings can be efficient, wavelength selective, and incident angle selective. Generally, liquid crystals possess physical properties that may be intermediate between conventional fluids and solids. While liquid crystals are fluid-like in some aspects, unlike most fluids, the arrangement of molecules within them exhibits some structural order. Accordingly, liquid crystal materials may be used to spatially vary one or more optical and/or structural characteristics and/or features across the area of a grating. This variation can be achieved, in some instances, by spatially varying alignment characteristics and/or other material properties of the liquid crystal molecules.

The optical properties of a grating can be determined by the physical structure(s) of the grating (such as, the periodicity, the depth, and the duty cycle) as well as material properties of the grating (such as, the refractive index, absorption, and birefringence). When liquid crystals are used, optical properties of the grating can be controlled by controlling, for example, the molecular orientation and/or distribution of the liquid crystal materials.

Liquid crystals having various states or phases can be configured to offer various desirable material properties for gratings or diffractive optical elements, including, without limitation, birefringence, optical anisotropy, and manufacturability (for example, using thin-film processes). For instance, by changing surface conditions of the liquid crystal layers and/or mixing different liquid crystal materials, grating structures with different and/or varying properties can be fabricated.

In addition to having wavelength and angle selectivity, liquid crystal polarization gratings can have polarization selectivity. Such polarization selectivity can be due to liquid crystal materials being anisotropic and exhibiting birefringence. In some implementations, a liquid crystal polarization grating can operate as a transmission Bragg grating or diffractive optical element (or as a reflecting Bragg grating or diffractive optical element) for light having the wavelength and oriented at the incident angle that satisfy the Bragg condition in Equation 1 for the transmission Bragg grating (or Equation 2 for the reflection Bragg grating) and also having a particular polarization, such as a circular polarization state For example, liquid crystal molecules can have a helical structure so that polarized light having the same circular handiness as the helical structure is reflected, while light having opposite polarization is transmitted (or vice versa). This type of liquid crystal polarization grating can exhibit circular polarization selectivity.

Liquid crystal polarization gratings can be utilized as in-coupling optical elements, which as described herein, may be used to redirect and in-couple the light into a waveguide. Liquid crystal polarization gratings can also be utilized as out-coupling optical elements, which as described herein, can be configured to extract light out of a waveguide. For such uses, liquid crystal polarization gratings can function as transmission Bragg gratings (or reflecting Bragg gratings). For example, light incident on a transmissive Bragg grating on the surface of a waveguide may be transmitted through the Bragg grating and diffracted at such an angle that the light is guided within the waveguide by total internal reflection. As another example, light guided within a waveguide that is incident on a transmissive Bragg grating on a surface of a waveguide may be transmitted through the Bragg grating and diffracted at such an angle that the light is no longer guided within the waveguide by total internal reflection but is instead out-coupled from the waveguide.

In some cases, it may be difficult or impractical to manufacture transmission liquid crystal polarization gratings. As referenced above, a liquid crystal polarization grating can be formed by aligning liquid crystal materials molecules on a substrate. To achieve the desired wavelength selectivity, angular selectivity, and/or polarization selectivity, the grating volume may be fabricated by building up (or stacking) liquid crystal molecules layer by layer. To satisfy the Bragg condition for transmission, a liquid crystal polarization grating may be a few microns thick (possibly less or more), which can involve stacking of many layers of liquid crystal molecules. It may be challenging and/or expensive to achieve high manufacturing yields using existing fabrication processes for making quality/high performance transmission liquid crystal polarization gratings.

In contrast, it may be easier to manufacture reflection liquid crystal polarization gratings. For example, the thickness of a reflection liquid crystal polarization grating may be smaller (to satisfy the Bragg condition for reflection). As a result, existing fabrication processes for liquid crystal polarization gratings may be used to make quality/high performance reflection liquid crystal polarization gratings.

Combined DOEs or Gratings

A volume phase grating or diffractive optical element such as a volume phase holographic ("VPH") grating or volume phase hologram can diffract light by, for example, a change (or modulation) in the index of refraction within a layer of material (such as, gelatin), which may possibly be sandwiched between two substrates (such as, glass, polymer, or the like). The VPH grating can be designed to work at different wavelengths and incident angles. The VPH grating can exhibit high efficiencies when the Bragg condition is satisfied. The VPH grating can be designed to have non-zero optical power and, for example, converge or diverge light. VPH gratings can be relatively easy and inexpensive to fabricate.

Figure 11:
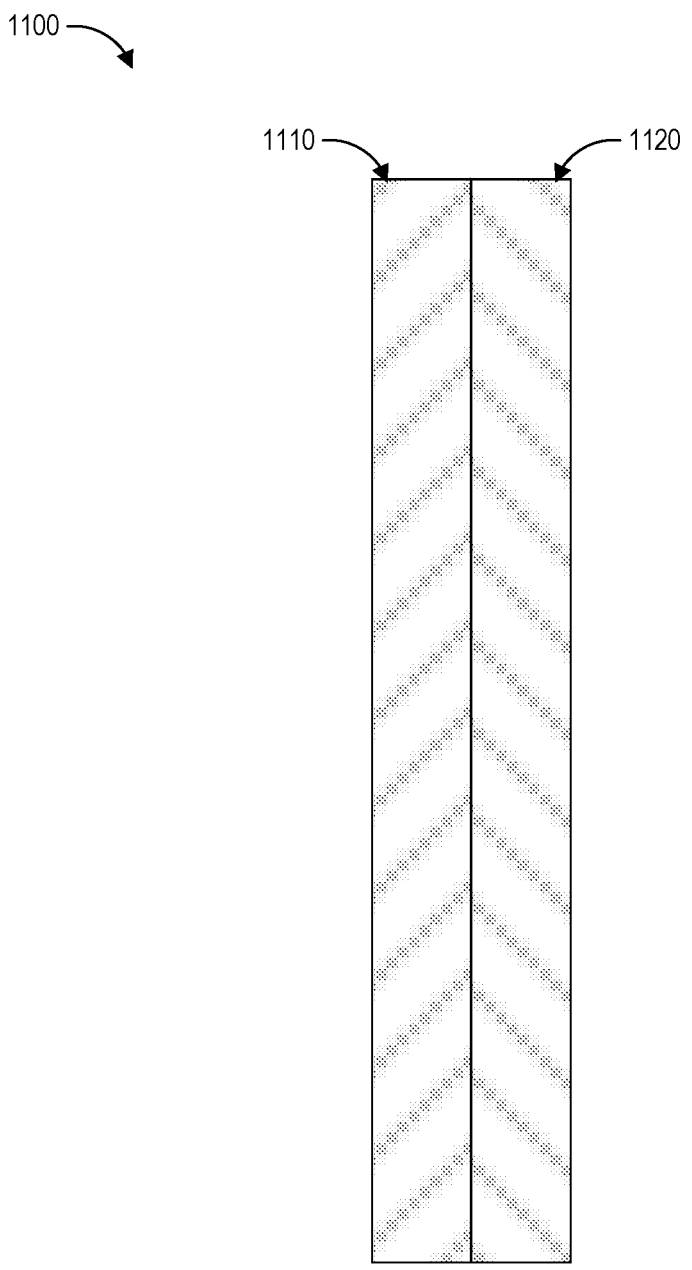
FIG. 11 illustrates transmissive diffractive optical element such as a Bragg grating formed by combining first and second reflective diffractive optical element.

A transmission Bragg grating or diffractive optical element can be formed by combining two reflective or reflection diffractive optical elements or gratings. As described below, one of the optical elements being combined can be polarization selective. As such, this optical element can reflect light having a certain polarization state(s) and transmit light having certain other polarization state(s). As a result, a transmission Bragg grating (i.e., a grating that satisfies the Bragg condition of Equation 1) can be formed. As illustrated in FIG. 11, a transmissive diffractive optical element or grating (e.g., a transmission volume DOE or grating or a transmission Bragg grating) 1100 can be formed by combining a first reflective diffractive optical element or grating (e.g., a first reflective volume DOE or grating or first reflecting Bragg grating) 1110 and a second reflective diffractive optical element or grating (e.g., a second reflective volume DOE or grating or second reflecting Bragg grating) 1120. The first and second reflective diffractive optical elements or gratings (e.g., volume DOEs or gratings or Bragg gratings) 1110 and 1120 can be different diffractive optical elements or gratings. As described herein, the first reflective diffractive optical element (e.g., volume DOE or grating or Bragg grating) 1110 can be a liquid crystal polarization grating, and the second diffractive optical element (e.g., volume DOE or grating or Bragg grating) 1120 can be a volume phase grating (e.g., volume phase holographic grating) or vice versa. As is illustrated, the two reflective diffractive optical elements (volume DOEs or gratings or Bragg gratings) 1110 and 1120 can be stacked; for example, the substrates or layers forming the two reflective diffractive optical elements (volume DOEs or gratings or Bragg gratings) 1110 and 1120 can be positioned in contact with each other, although in some implementations one or more intervening layers may be included between the two reflective diffractive optical elements 1110 and 1120.

Figure 12:
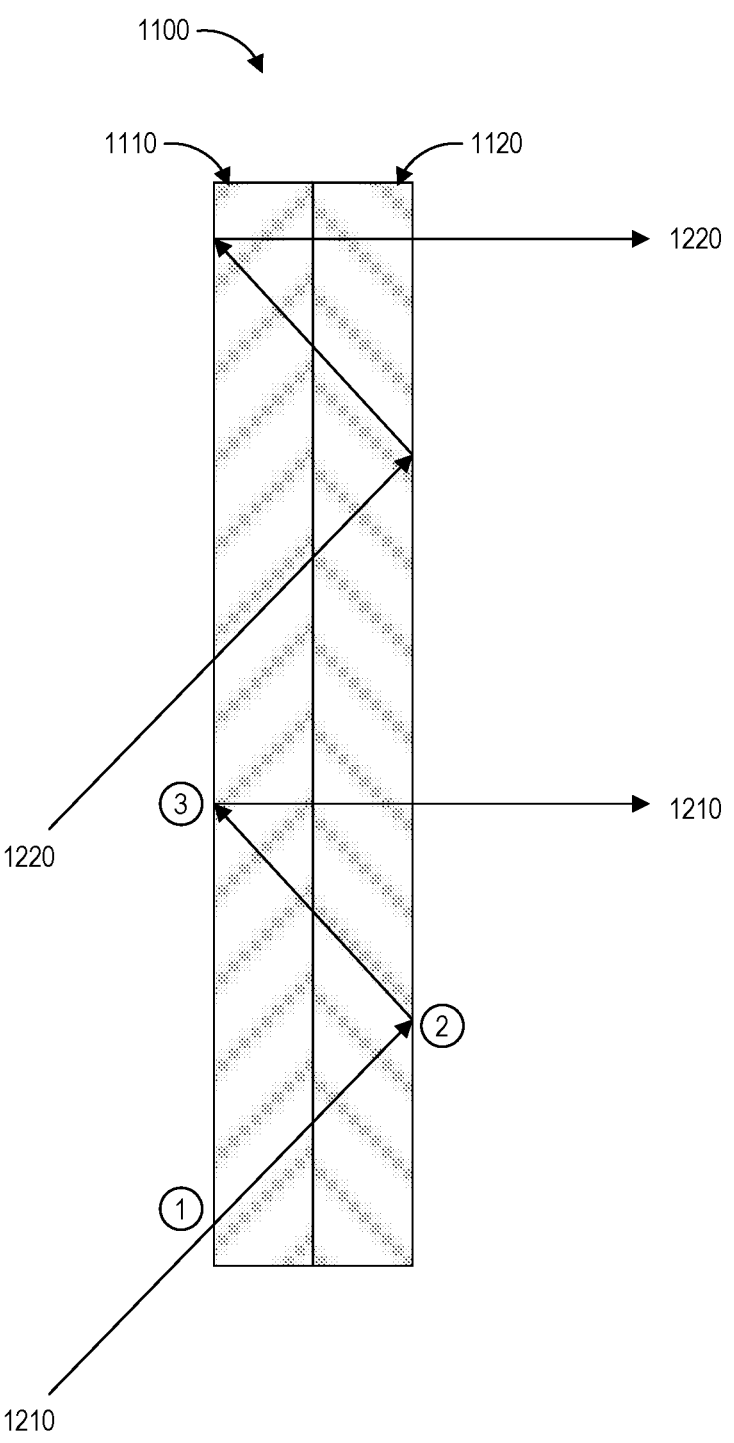
FIG. 12 illustrates operation of the transmissive diffractive optical element of FIG. 11.

FIG. 12 illustrates operation of the transmissive diffractive optical element 1100 formed from the combination of the reflective gratings 1110 and 1120. Light rays 1210 and 1220 are illustrated as being incident on the first reflective grating 1110, which can be a reflecting liquid crystal polarization grating configured (or functioning) as a reflecting Bragg grating. As described herein, a liquid crystal polarization grating can function as a Bragg grating, for example, when the Bragg condition is satisfied. The liquid crystal polarization grating 1110 can be wavelength selective, angle selective, and polarization selective. One or more of the wavelength, incident angle, or polarization state of the light rays 1210 and 1220 can be selected to permit the light rays to pass through the liquid crystal polarization grating 1100 without being substantially affected (e.g., diffracted) as shown in step 1. For example, linearly polarized light may pass through the liquid crystal polarization grating 1110. The wavelength(s) and/or incident angle(s) of such linearly polarized light may also be selected for the light to pass through the liquid crystal polarization grating 1110. In some implementations, for example, the polarization state of the light rays 1210 and 1220 can be adjusted (for example, via one or more retarders or waveplates or polarizers, etc. to provide the correct polarization, e.g., linearly polarized) to be such that the light rays 1210 and 1220 incident on the first reflective grating 1110 pass through without being substantially affected. In step 1, the reflecting liquid crystal polarization grating 1110 can transmit the light, thereby functioning as a transmitting grating (assuming that the light is of the correct polarization, e.g., linearly polarized, in various implementations).

Subsequently, the light rays 1210 and 1220 can be reflected by the second reflective grating 1120. The second reflective grating 1120 can be a volume phase holographic grating configured (or functioning) as a reflecting Bragg grating. As described herein, a volume phase holographic grating can function as a Bragg grating, for example, the Bragg condition is satisfied. The second reflective grating 1120 can be angle selective and wavelength selective in various implementations. In some cases, due to the incident angle and wavelength of the light rays 1210 and 1220 satisfying the Bragg condition for diffraction, the light rays can be reflected by the second reflective grating 1120 (as shown in step 2).

In some implementations, the polarization state of light may change, for example, on reflection from the second reflective grating 1120. Without subscribing to any particular scientific theory, this change in polarization may potentially be determined by Fresnel reflection boundary conditions in at least some cases. Alternatively or in addition, one or more layers may be included to provide for transformation of the polarization state of light reflected from the second reflective grating 1120. A retarder layer may, for example, be included that provides for rotation or conversion of the polarization state of light reflected from the second reflective grating 1120 such that this polarization is different upon reaching the first reflective grating 1110. The polarization may transform from a first state at a first time when incident on the first reflective grating 1110 (for example, step 1) to a second state that is incident on the first reflective grating 1110 at a second time after being reflected from the second reflecting grating 1120 (for example, step 2). This polarization may transform from the first state into the second state via reflection off the second reflective grating 1120, via propagation through the first reflective grating 1110, via propagation through the interface between the first and second reflective ratings or any combination of these as well as possibly via other effects or features of the grating 1100. The first and second polarization states may comprise, for example, a linear polarization state and a circular polarization state (which may be, a right or left hand circular polarization state). Reflection of light by the second reflective grating 1120 may change the polarization state of light from linear polarization to circular polarization.

As shown in FIG. 12, light rays 1210 and 1220 reflected by the second reflective grating 1120 are redirected toward the liquid crystal polarization grating 1110. In certain implementations, because the liquid crystal polarization grating 1110 is polarization selective and because the polarization state of the light has been altered, e.g., by reflection by the grating 1120, the light rays 1210 and 1220 can be diffracted and reflected by the first reflective grating 1110 as shown in step 3. As described herein, the liquid crystal polarization grating 1110 can exhibit circular polarization selectivity (for example, liquid crystal molecules can have a helical struc- ture so that polarized light having the same circular handi- ness as the helical structure is reflected). Light having the second polarization state (such as, circularly polarized light) incident on the liquid crystal polarization grating 1110 can be reflected as shown in step 3. Diffraction from the grating 1110 can (for example, assuming for example that the light is of the correct polarization state, e.g., circularly polarized), in some configurations, cause the light rays to propagate back through the second reflective grating 1120. Due to angular selectivity of the second reflective grating 1120, such change in the angle can cause the second reflective grating 1120 to permit the light rays to pass through without being substantially affected (e.g., diffracted). In this manner light incident on the grating 1100 can pass therethrough. As a result, the grating 1100 can function as a transmissive grating.

The grating 1100 can be used in various ways. The grating 1100 can, for example, be used to as an in-coupling optical element, which may redirect and in-couple the light into a waveguide. The grating 1100 can also be used as an out- coupling optical element, which as described herein, can be configured to extract light out of a waveguide. The grating 1100 may have zero optical power so as to not alter the image quality in some but should not be so limited. While for simplicity, in FIG. 12, light is illustrated as being reflected by the bottom surface of the reflective grating 1120 and the top surface of the grating 1110, however, in some variations light can be reflected by a volume within the first and second reflective gratings 1110 or 1120.

Described combined reflective diffractive optical ele- ments or gratings (e.g., volume DOEs or gratings), which when combined can function as transmission Bragg grating (such as the grating 1100), can retain the advantages of liquid crystal polarization gratings while possibly simplify- ing the fabrication process, increasing yields, providing other benefits, or any combination of these. As described above, the manufacturing challenges associated with making a transmissive liquid crystal polarization grating that satis- fies the Bragg condition can be avoided.

In some implementations, "transmission," "transmissive," "transmitting," or "transparent" may allow at least some (such as, at least 20%, 30% 50%, 60%, 70%, 80%, 90%, 95%, 97%, 99%, 99.5%, 99.7%, 99.9% or more) of incident light to pass therethrough or may be characterized by optical transmission in any range formed by any of these values. Accordingly, a transparent substrate may be a glass, poly- mer, or sapphire. Haze level can be indicative of cloudiness of a material caused by scattering of light. A transparent material may have haze level of about 1% or less, 2%, 3%, 4%, 5%, 6%, 7%, 8%, 9%, 10% or more. "Reflection," "reflecting," or "reflective" may reflect at least some (such as, at least 20%, 30%, 50%, 70%, 90%, 95%, 97%, 99%, 99.5%, 99.7%, 99.9% or more) of the incident light or may be characterized by optical transmission in any range formed by any of these values.

In some implementations, light is polarized (e.g., linearly polarized or circularly polarized) with an extinction ratio that is 5:1 or less or more, 10:1 or less or more, 50:1 or less or more, 100:1 or less or more, 500:1 or less or more, 1000:1 or less or more, 10,000:1 or less or more, 100,000:1 or less or more, 1,000,000:1 or less or more, 10,000,000:1 or less or more or in any range formed by any of these values. This extinction ratio may apply to polarized light that is initially incident on the first reflective diffractive optical element, or that is incident on the second reflective diffractive optical element after having been transmitted through the first reflective diffractive optical element, or upon reflection from the second reflective diffractive optical element and being directed toward the first reflective diffractive optical ele- ment, or when incident on the first reflective diffractive optical element after being reflected from the second reflec- tive diffractive optical element, or after reflection from the first reflective diffractive optical element and being directed toward the second reflective diffractive optical element, or when incidence on the second reflective diffractive optical element after being reflected by the first reflective diffractive optical element or any combination of these.

A wide range of variations are possible. For example, the diffraction grating may include additional layers, such as layers between the first and second reflective gratings 1110, 1120 or layers outside of these. Other variations are possible.

Additional Examples

Example 1. A head-mounted display system configured to be worn by a user comprising:
  a head-mountable frame;
  a light projection system configured to output light to provide image content to the user's eye;
  a waveguide supported by the frame, the waveguide configured to guide at least a portion of the light from the light projection system coupled into the waveguide to present said image content to said user's eye; and
  a grating comprising:
    a first reflective diffractive optical element comprising a volume phase holographic grating; and
    a second reflective diffractive optical element compris- ing a liquid crystal polarization grating,
  wherein a combination of the first and second reflective diffractive optical elements are disposed on one side of the waveguide and are configured to operate as a transmissive diffractive optical element.

Example 2. The head-mounted display system of example 1, wherein the grating is configured to transmit light directed toward the grating from the light projection system or the waveguide.

Example 3. The head-mounted display system of any of examples 1 to 2, wherein the combination of the first and second reflective diffractive optical elements are configured to operate as a transmission Bragg grating.

Example 4. The head-mounted display system of any of the examples 1 to 3, wherein said grating comprises an outcoupling grating configured to couple light guided within said waveguide out the waveguide toward the user's eye.

Example 5. The head-mounted display system of any of examples 1 to 4, wherein said grating comprises an in-coupling grating configured to couple light into the waveguide such that said light coupled into said waveguide propagates therein by total internal reflection.

Example 6. The head-mounted display system of any of examples 1 to 5, wherein:

the first reflective diffractive optical element comprising the volume phase holographic grating is configured to reflect light directed toward the first reflective diffractive optical element toward the second reflective diffractive optical element;

the second reflective diffractive optical element comprising the liquid crystal polarization grating is configured to reflect light reflected by the first reflective diffractive optical element back toward said first reflective diffractive optical element; and the first reflective diffractive optical element is configured to transmit light reflected by the second reflective diffractive optical element.

Example 7. The head-mounted display system of any of examples 1 to 6, wherein the first reflective diffractive optical element comprising the volume phase holographic grating is configured to reflect light at a particular incident angle and transmit light at other incident angles.

Example 8. The head-mounted display system of any of examples 1 to 7, wherein the second reflective diffractive optical element comprising the liquid crystal polarization grating is configured to transmit incident light having a first polarization state and reflect incident light polarized having a second different polarization state.

Example 9. The head-mounted display system of example 8, wherein the first polarization state comprises a linear polarization state and the second polarization state comprises a circular polarization state.

Example 10. The head-mounted display system of any of examples 1 to 9, wherein the polarization state of light is changed as a result of reflection of the light by the first reflective diffractive optical element comprising the volume phase polarization grating.

Example 11. The head-mounted display system of example 10, wherein the polarization state of light is changed to a polarization state that is transmitted by the second reflective diffractive optical element comprising the liquid crystal polarization grating as a result of reflection of the light by the first reflective diffractive optical element comprising the volume phase polarization grating.

Example 12. The head-mounted display system of any of the examples 1 to 11, wherein the waveguide comprises a forward side and a rearward side, the rearward side configured to be positioned closer to an eye of a wearer, and wherein the transmissive diffractive optical element is disposed on the rearward side of the waveguide.

Example 13. The head-mounted display system of example 12, wherein the transmissive diffractive optical element is configured to in-couple at least some light from the light projection system into the waveguide.

Example 14. The head-mounted display system of example 12, wherein the transmissive diffractive optical element is configured to extract at least some light guided by the waveguide out of the waveguide.

Example 15. The head-mounted display system of any of examples 1 to 14, wherein the first and second reflective diffractive optical elements are stacked one on the other.

Example 16. The head-mounted display system of example 15, wherein the first reflective diffractive optical element comprises a first layer and the second reflective diffractive optical element comprises a second layer, and wherein the first and second layers are stacked one on the other and on the waveguide.

Example 17. The head-mounted display system of any of examples 1 to 16, wherein said waveguide is included with a plurality of waveguides configured to receive light from said light projection system.

Example 18. A head-mounted display system configured to be worn by a user comprising:

a head-mountable frame;

a light projection system configured to output light to provide image content to the user's eye;

a waveguide supported by the frame, the waveguide configured to guide at least a portion of the light from the light projection system coupled into the waveguide to present said image content to said user's eye; and a grating comprising:

a first reflective diffractive optical element; and a second reflective diffractive optical element comprising a liquid crystal polarization grating, wherein a combination of the first and second reflective diffractive optical elements are disposed on one side of the waveguide and are configured to operate as a transmissive diffractive optical element.

Example 19. The head-mounted display system of example 18, wherein the grating is configured to transmit light directed toward the grating from the light projection system or the waveguide.

Example 20. The head-mounted display system of any of examples 18 to 19, wherein the combination of the first and second reflective diffractive optical elements are configured to operate as a transmission Bragg grating.

Example 21. The head-mounted display system of any of examples 18 to 20, wherein said grating comprises an outcoupling grating configured to couple light guided within said waveguide out the waveguide toward the user's eye.

Example 22. The head-mounted display system of any of examples 18 to 21, wherein said grating comprises an in-coupling grating configured to couple light into the waveguide such that said light coupled into said waveguide propagates therein by total internal reflection.

Example 23. The head-mounted display system of any of examples 18 to 22, wherein the first reflective diffractive optical element comprises a volume phase diffractive optical element.

Example 24. The head-mounted display system of any of examples 18 to 23, wherein the first reflective diffractive optical element comprises a volume phase grating.

Example 25. The head-mounted display system of any of examples 18 to 24, wherein the first reflective diffractive optical element comprises a volume phase holographic grating.

Example 26. The head-mounted display system of any of examples 18 to 25, wherein the first reflective diffractive optical element does not comprise a liquid crystal polarization grating.

Example 27. The head-mounted display system of any of examples 18 to 26, wherein:

the first reflective diffractive optical element is configured to reflect light directed toward the first reflective diffractive optical element toward the second reflective diffractive optical element;

the second reflective diffractive optical element is configured to reflect light reflected by the first reflective diffractive optical element back toward said first reflective diffractive optical element; and the first reflective diffractive optical element is configured to transmit light reflected by the second reflective diffractive optical element.

Example 28. The head-mounted display system of any of examples 18 to 27 wherein the first reflective diffractive optical element is configured to reflect light at a particular incident angle and transmit light at other incident angles.

Example 29. The head-mounted display system of any of examples 18 to 28, wherein the second reflective diffractive optical element comprising the liquid crystal polarization grating is configured to transmit incident light having a first polarization state and reflect incident light polarized having a second different polarization state.

Example 30. The head-mounted display system of example 29, wherein the first polarization state comprises a linear polarization state and the second polarization state comprises a circular polarization state.

Example 31. The head-mounted display system of any of examples 18 to 30, wherein the polarization state of light is changed as a result of reflection of the light by the first reflective diffractive optical element.

Example 32. The head-mounted display system of any of examples 18 to 31, wherein the polarization state of light is changed to a polarization state that is transmitted by the second reflective diffractive optical element as a result of reflection of the light by the first reflective diffractive optical element.

Example 33. The head-mounted display system of any of examples 18 to 32, wherein the waveguide comprises a forward side and a rearward side, the rearward side configured to be positioned closer to an eye of a wearer, and wherein the transmissive diffractive optical element is disposed on the rearward side of the waveguide.

Example 34. The head-mounted display system of example 33, wherein the transmissive diffractive optical element is configured to in-couple at least some light from the light projection system into the waveguide.

Example 35. The head-mounted display system of example 33, wherein the transmissive diffractive optical element is configured to extract at least some light guided by the waveguide out of the waveguide.

Example 36. The head-mounted display system of any of examples 18 to 35, wherein the first and second reflective diffractive optical elements are stacked one on the other.

Example 37. The head-mounted display system of example 36, wherein the first reflective diffractive optical element comprises a first layer and the second reflective diffractive optical element comprises a second layer, and wherein the first and second layers are stacked one on the other and on the waveguide.

Example 38. The head-mounted display system of any of examples 18 to 37, wherein said waveguide is included with a plurality of waveguides configured to receive light from said light projection system.

Example 39. A head-mounted display system configured to be worn by a user comprising:

a head-mountable frame;

a light projection system configured to output light to provide image content to the user's eye;

a waveguide supported by the frame, the waveguide configured to guide at least a portion of the light from the light projection system coupled into the waveguide to present said image content to said user's eye; and a grating comprising:

a first reflective diffractive optical element; and a second reflective diffractive optical element different from the first reflective diffractive optical element, wherein a combination of the first and second reflective diffractive optical elements are configured to operate as a transmissive diffractive optical element, said transmissive diffractive optical element comprising (i) an in-coupling optical element configured to couple light from said light projection system into said waveguide to be guided therein by total internal reflection or (ii) an out-coupling optical element configured to couple light guided within said waveguide out of said waveguide and direct said light to the user's eye.

Example 40. The head-mounted display system of example 39, wherein the first reflective optical element comprises volume a phase holographic grating and the second reflective diffractive optical element comprises a liquid crystal polarization grating.

Example 41. The head-mounted display system of example 39 or 40, wherein said transmissive diffractive optical element comprises an in-coupling optical element configured to couple light from said light projection system into said waveguide to be guided therein by total internal reflection.

Example 42 The head-mounted display system of any of examples 39 to 41, wherein said transmissive diffractive optical element comprises an out-coupling optical element configured to couple light guided within said waveguide out of said waveguide and direct said light to the user's eye.

Example 43. The head-mounted display system of any of examples 39 to 42, wherein the transmissive diffractive optical element is configured to transmit light directed toward the transmissive diffractive optical element from the light projection system or the waveguide.

Example 44. The head-mounted display system of any of examples 39 to 43, wherein the transmissive diffractive optical element is configured to operate as a transmission Bragg grating.

Example 45. The head-mounted display system of any of examples 39 to 44, wherein the first reflective diffractive optical element comprises a volume phase diffractive optical element.

Example 46. The head-mounted display system of any of examples 39 to 45, wherein the first reflective diffractive optical element comprises a volume phase grating.

Example 47. The head-mounted display system of any of examples 39 to 46, wherein the first reflective diffractive optical element comprises a volume phase holographic grating.

Example 48. The head-mounted display system of any of examples 39 to 47, wherein the first reflective diffractive optical element does not comprise a liquid crystal polarization grating and the second reflective diffractive optical element comprises a liquid crystal polarization grating.

Example 49. The head-mounted display system of any of examples 39 to 48, wherein:

the first reflective diffractive optical element is configured to reflect light directed toward the first reflective diffractive optical element toward the second reflective diffractive optical element;

the second reflective diffractive optical element is configured to reflect light reflected by the first reflective diffractive optical element back toward said first reflective diffractive optical element; and the first reflective diffractive optical element is configured to transmit light reflected by the second reflective diffractive optical element.

Example 50. The head-mounted display system of any of examples 39 to 49, wherein the first reflective diffractive optical element is configured to reflect light at a particular incident angle and transmit light at other incident angles.

Example 51. The head-mounted display system of any of examples 39 to 50, wherein the second reflective diffractive optical element comprises a liquid crystal polarization grating and is configured to transmit incident light having a first polarization state and reflect incident light polarized having a second different polarization state.

Example 52. The head-mounted display system of example 51, wherein the first polarization state comprises a linear polarization state and the second polarization state comprises a circular polarization state.

Example 53. The head-mounted display system of any of examples 39 to 52, wherein the polarization state of light is changed as a result of reflection of the light by the first reflective diffractive optical element.

Example 54. The head-mounted display system of any of examples 39 to 53, wherein the polarization state of light is changed to a polarization state that is transmitted by the second reflective diffractive optical element as a result of reflection of the light by the first reflective diffractive optical element.

Example 55. The head-mounted display system of any of examples 39 to 54, wherein the waveguide comprises a forward side and a rearward side, the rearward side configured to be positioned closer to an eye of a wearer, and wherein the transmissive diffractive optical element is disposed on the rearward side of the waveguide.

Example 56. The head-mounted display system of example 55, wherein the transmissive diffractive optical element is configured to in-couple at least some light from the light projection system into the waveguide.

Example 57. The head-mounted display system of example 55, wherein the transmissive diffractive optical element is configured to extract at least some light guided by the waveguide out of the waveguide.

Example 58. The head-mounted display system of any of examples 39 to 57, wherein the first and second reflective diffractive optical elements are stacked one on the other.

Example 59. The head-mounted display system of example 58, wherein the first reflective diffractive optical element comprises a first layer and the second reflective diffractive optical element comprises a second layer, and wherein the first and second layers are stacked one on the other and on the waveguide.

Example 60. The head-mounted display system of any of examples 39 to 59, wherein said waveguide is included with a plurality of waveguides configured to receive light from said light projection system.

Example 61. A head-mounted display system configured to be worn by a user comprising:

a head-mountable frame;

a light projection system configured to output light to provide image content to the user's eye;

a waveguide supported by the frame, the waveguide configured to guide at least a portion of the light from the light projection system coupled into the waveguide to present said image content to said user's eye; and a grating comprising:

a first reflective diffractive optical element; and a second reflective diffractive optical element configured to reflect a first polarization state and to transmit a second polarization state different from said first polarization state, wherein a combination of the first and second reflective diffractive optical elements are disposed on one side of the waveguide and are configured to operate as a transmissive diffractive optical element.

Example 62. The head-mounted display system of example 61, wherein the first polarization state comprises a circular polarization state and the second polarization state comprises a linear polarization state.

Example 63. The head-mounted display system of any of examples 61 to 62, wherein the grating is configured to transmit light directed toward the grating from the light projection system or the waveguide.

Example 64. The head-mounted display system of any of examples 61 to 63, wherein the combination of the first and second reflective diffractive optical elements are configured to operate as a transmission Bragg grating.

Example 65. The head-mounted display system of any of examples 61 to 64, wherein said grating comprises an outcoupling grating configured to couple light guided within said waveguide out the waveguide toward the user's eye.

Example 66. The head-mounted display system of any of examples 61 to 65, wherein said grating comprises an in-coupling grating configured to couple light into the waveguide such that said light coupled into said waveguide propagates therein by total internal reflection.

Example 67. The head-mounted display system of any of examples 61 to 66, wherein the first reflective diffractive optical element comprises a volume phase diffractive optical element.

Example 68. The head-mounted display system of any of examples 61 to 67, wherein the first reflective optical element comprises volume a phase holographic grating and the second reflective diffractive optical element comprises a liquid crystal polarization grating.

Example 69. The head-mounted display system of any of examples 61 to 68, wherein:

the first reflective diffractive optical element is configured to reflect light directed toward the first reflective diffractive optical element toward the second reflective diffractive optical element;

the second reflective diffractive optical element is configured to reflect light reflected by the first reflective diffractive optical element back toward said first reflective diffractive optical element; and the first reflective diffractive optical element is configured to transmit light reflected by the second reflective diffractive optical element.

Example 70. The head-mounted display system of any of examples 61 to 69, wherein the first reflective diffractive optical element is configured to reflect light at a particular incident angle and transmit light at other incident angles.

Example 71. The head-mounted display system of any of examples 61 to 70, wherein the polarization state of light is changed as a result of reflection of the light by the first reflective diffractive optical element.

Example 72. The head-mounted display system of example 71, wherein the polarization state of light is changed to the second polarization state as a result of reflection of the light by the first reflective diffractive optical element.

Example 73. The head-mounted display system of any of examples 61 to 72, wherein the waveguide comprises a forward side and a rearward side, the rearward side configured to be positioned closer to an eye of a wearer, and wherein the transmissive diffractive optical element is disposed on the rearward side of the waveguide.

Example 74. The head-mounted display system of example 73, wherein the transmissive diffractive optical element is configured to in-couple at least some light from the light projection system into the waveguide.

Example 75. The head-mounted display system of example 73, wherein the transmissive diffractive optical element is configured to extract at least some light guided by the waveguide out of the waveguide.

Example 76. The head-mounted display system of any of examples 61 to 75, wherein the first and second reflective diffractive optical elements are stacked one on the other.

Example 77. The head-mounted display system of example 76, wherein the first reflective diffractive optical element comprises a first layer and the second reflective diffractive optical element comprises a second layer, and wherein the first and second layers are stacked one on the other and on the waveguide.

Example 78. The head-mounted display system of any of examples 61 to 77, wherein said waveguide is included with a plurality of waveguides configured to receive light from said light projection system.

Additional Considerations

Any of the features described herein with respect to any eyepiece waveguide can alternatively be implemented with any other eyepiece waveguide described herein.

Unless the context clearly requires otherwise, throughout the description and the claims, the words "comprise," "comprising," "include," "including," "have" and "having" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Depending on the context, "coupled" or "connected" may refer to an optical coupling or optical connection such that light is coupled or connected from one optical element to another optical element. Additionally, the words "herein," "above," "below," "infra," "supra," and words of similar import, when used in this application, shall refer to this application as a whole and not to any particular portions of this application. Where the context permits, words in the above Detailed Description using the singular or plural number may also include the plural or singular number, respectively. The word "or" in reference to a list of two or more items is an inclusive (rather than an exclusive) "or", and "or" covers all of the following interpretations of the word: any of the items in the list, all of the items in the list, and any combination of one or more of the items in the list, and does not exclude other items being added to the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements, and/or states are in any way required for one or more embodiments or whether these features, elements, and/or states are included or are to be performed in any particular embodiment.

While certain embodiments have been described, these embodiments have been presented by way of example only, and are not intended to limit the scope of the disclosure. Features of any one of the embodiments can be combined and/or substituted with features of any other one of the embodiments. Certain advantages of various embodiments have been described herein. But not all embodiments necessarily achieve each of these advantages.

Embodiments have been described in connection with the accompanying drawings. However, the figures are not drawn to scale. Distances, angles, etc. are merely illustrative and do not necessarily bear an exact relationship to actual dimensions and layout of the devices illustrated.

The foregoing embodiments have been described at a level of detail to allow one of ordinary skill in the art to make and use the devices, systems, methods, etc. described herein. A wide variety of variation is possible. Components, elements, and/or steps may be altered, added, removed, or rearranged. While certain embodiments have been explicitly described, other embodiments will become apparent to those of ordinary skill in the art based on this disclosure.

What is claimed is:

1. A head-mounted display system configured to be worn by a user comprising:
   a head-mountable frame;
   a light projection system configured to output light to provide image content to the user's eye;
   a waveguide supported by the frame, the waveguide configured to guide at least a portion of the light from the light projection system coupled into the waveguide to present said image content to said user's eye; and
   a grating comprising:
      a first reflective diffractive optical element comprising a volume phase holographic grating; and
      a second reflective diffractive optical element comprising a liquid crystal polarization grating,
   wherein a combination of the first and second reflective diffractive optical elements are disposed on one side of the waveguide and are configured to operate as a transmissive diffractive optical element, and
   wherein the first and second reflective diffractive optical elements are stacked one on the other.

2. The head-mounted display system of claim 1, wherein the grating is configured to transmit light directed toward the grating from the light projection system or the waveguide.

3. The head-mounted display system of claim 1, wherein the combination of the first and second reflective diffractive optical elements are configured to operate as a transmission Bragg grating.

4. The head-mounted display system of claim 1, wherein said grating comprises an outcoupling grating configured to couple light guided within said waveguide out the waveguide toward the user's eye.

5. The head-mounted display system of claim 1, wherein said grating comprises an in-coupling grating configured to couple light into the waveguide such that said light coupled into said waveguide propagates therein by total internal reflection.

6. The head-mounted display system of claim 1, wherein the second reflective diffractive optical element comprising the liquid crystal polarization grating is configured to transmit incident light having a first polarization state and reflect incident light polarized having a second different polarization state.

7. The head-mounted display system of claim 1, wherein the waveguide comprises a forward side and a rearward side, the rearward side configured to be positioned closer to an eye of a wearer, and wherein the transmissive diffractive optical element is disposed on the rearward side of the waveguide.

8. The head-mounted display system of claim 7, wherein the transmissive diffractive optical element is configured to in-couple at least some light from the light projection system into the waveguide.

9. The head-mounted display system of claim 7, wherein the transmissive diffractive optical element is configured to extract at least some light guided by the waveguide out of the waveguide.

10. The head-mounted display system of claim 1, wherein the first reflective diffractive optical element comprises a first layer and the second reflective diffractive optical element comprises a second layer, and wherein the first and second layers are stacked one on the other and on the waveguide.

11. The head-mounted display system of claim 1, wherein said waveguide is included with a plurality of waveguides configured to receive light from said light projection system.

12. A head-mounted display system configured to be worn by a user comprising:
  a head-mountable frame;
  a light projection system configured to output light to provide image content to the user's eye;
  a waveguide supported by the frame, the waveguide configured to guide at least a portion of the light from the light projection system coupled into the waveguide to present said image content to said user's eye; and
  a grating comprising:
    a first reflective diffractive optical element comprising a volume phase holographic grating; and
    a second reflective diffractive optical element comprising a liquid crystal polarization grating,
  wherein a combination of the first and second reflective diffractive optical elements are disposed on one side of the waveguide and are configured to operate as a transmissive diffractive optical element,
  wherein the first reflective diffractive optical element comprising the volume phase holographic grating is configured to reflect light directed toward the first reflective diffractive optical element toward the second reflective diffractive opticalelement,
  wherein the second reflective diffractive optical element comprising the liquid crystal polarization grating is configured to reflect light reflected by the first reflective diffractive optical element back toward said first reflective diffractive optical element, and
  wherein the first reflective diffractive optical element is configured to transmit light reflected by the second reflective diffractive optical element.

13. A head-mounted display system configured to be worn by a user comprising:
  a head-mountable frame;
  a light projection system configured to output light to provide image content to the user's eye;
  a waveguide supported by the frame, the waveguide configured to guide at least a portion of the light from the light projection system coupled into the waveguide to present said image content to said user's eye; and
  a grating comprising:
    a first reflective diffractive optical element comprising a volume phase holographic grating; and
    a second reflective diffractive optical element comprising a liquid crystal polarization grating,
  wherein a combination of the first and second reflective diffractive optical elements are disposed on one side of the waveguide and are configured to operate as a transmissive diffractive optical element, and
  wherein the first reflective diffractive optical element comprising the volume phase holographic grating is configured to reflect light at a particular incident angle and transmit light at other incident angles.

14. A head-mounted display system configured to be worn by a user comprising:
  a head-mountable frame;
  a light projection system configured to output light to provide image content to the user's eye;
  a waveguide supported by the frame, the waveguide configured to guide at least a portion of the light from the light projection system coupled into the waveguide to present said image content to said user's eye; and
  a grating comprising:
    a first reflective diffractive optical element comprising a volume phase holographic grating; and
    a second reflective diffractive optical element comprising a liquid crystal polarization grating,
  wherein a combination of the first and second reflective diffractive optical elements are disposed on one side of the waveguide and are configured to operate as a transmissive diffractive optical element,
  wherein the second reflective diffractive optical element comprising the liquid crystal polarization grating is configured to transmit incident light having a first polarization state and reflect incident light polarized having a second different polarization state, and
  wherein the first polarization state comprises a linear polarization state and the second polarization state comprises a circular polarization state.

15. A head-mounted display system configured to be worn by a user comprising:
  a head-mountable frame;
  a light projection system configured to output light to provide image content to the user's eye;
  a waveguide supported by the frame, the waveguide configured to guide at least a portion of the light from the light projection system coupled into the waveguide to present said image content to said user's eye; and
  a grating comprising:
    a first reflective diffractive optical element comprising a volume phase holographic grating; and a second reflective diffractive optical element compris-
ing a liquid crystal polarization grating,
wherein a combination of the first and second reflective
diffractive optical elements are disposed on one side of
the waveguide and are configured to operate as a
transmissive diffractive optical element, and
wherein the polarization state of light is changed as a
result of reflection of the light by the first reflective
diffractive optical element comprising the volume
phase holographic grating.

16. The head-mounted display system of claim 15,
wherein the polarization state of light is changed to a
polarization state that is transmitted by the second reflective
diffractive optical element comprising the liquid crystal
polarization grating as a result of reflection of the light by
the first reflective diffractive optical element comprising the
volume phase holographic grating.

\* \* \* \* \*